(12) United States Patent
Jackson et al.

(10) Patent No.: US 6,886,317 B2
(45) Date of Patent: May 3, 2005

(54) LOW ENERGY SICKLE MOWER AND SYSTEM USING CONTROLLED GAP THIN BLADE SHEAR PROCESS AND TORQUE MANAGEMENT

(75) Inventors: Jonathan A. Jackson, Dayton, OH (US); Kordon E. Krofft, Pleasant Hill, OH (US)

(73) Assignee: Global Neighbor Incorporated, Wilberforce, OH (US)

( * ) Notice: Subject to any disclaimer, the term of this patent is extended or adjusted under 35 U.S.C. 154(b) by 0 days.

(21) Appl. No.: 10/351,020

(22) Filed: Jan. 25, 2003

(65) Prior Publication Data
US 2004/0144075 A1 Jul. 29, 2004

(51) Int. Cl.[7] ............................................. A01D 34/13
(52) U.S. Cl. ........................................ 56/298; 56/296
(58) Field of Search ............................ 56/10.2 R, 10.3, 56/10.4, 10.2 J, 296, 298, 299, 303, 304, 305, 306, 307

(56) References Cited

U.S. PATENT DOCUMENTS

| | | |
|---|---|---|
| 153,755 A | 8/1874 | Crawford |
| 765,126 A | 7/1904 | Chaplin |
| 845,547 A | 1/1907 | Hathaway |
| 1,258,671 A | 3/1918 | Greenfield |
| 1,647,867 A | 11/1927 | Hutsell |
| 1,775,421 A | 9/1930 | Clark |
| 2,079,945 A | 5/1937 | Manning |
| 2,186,126 A | 1/1940 | Roll |
| 2,714,280 A | 8/1955 | Baker |
| 2,793,487 A | 5/1957 | Wobermin |
| 3,006,126 A | 10/1961 | Viverette |
| 3,006,129 A | 10/1961 | Sayre |
| 3,242,659 A | 3/1966 | Dunlap |
| 3,397,524 A | 8/1968 | Hofer |
| 3,633,346 A | 1/1972 | McMullen |
| 3,641,752 A | 2/1972 | Ipbach |
| 3,656,285 A | 4/1972 | Carlson |

(Continued)

*Primary Examiner*—Robert E. Pezzuto
*Assistant Examiner*—Nathan S Mammen
(74) *Attorney, Agent, or Firm*—Elting Patents and Technology LLC; Mark J. Elting

(57) ABSTRACT

Low energy non-interference unbiased shear process employing a thin dull blade laterally moving between upper and lower stators. Blades and stators are not biased or pressed together while cutting, as is done with a pair of scissors. Instead, the dull cutting blade is guidingly supported by said upper and lower stators, and the upper and lower stators are sized and formed such that a thickness of a cutting zone (M) formed therebetween exceeds the thickness of a blade zone (VZ) formed by the dull cutting blade, by a total controlled gap (Z) of preferably between 1 and 5 mils (0.0254–0.127 mm). The cutting blade is preferably thin in relation to grass cross section, preferably 10 to 50 mils (0.254 mm–1.27 mm). This arrangement provides two true shearing sites for grass at upper and lower leading edges of the blade. Adequate blade swipe frequency is provided, with gentle C-shape blade profiles yielding self-cleaning blades with lower running friction. Tensile failure of the grass is avoided. A torque management system performs motor load monitoring and modulation of blade position. To reject obstructions and clean the blade, the blade can be made to reverse direction, jitter, or reciprocate. Instead of attempting to slice or slam through obstructions using a high energy, high torque prime mover, a low energy low torque prime mover is utilized in conjunction with an intelligent reversing, obstruction clearing, and blade cleaning system that saves energy, reduces noise, frees and rejects obstructions, avoids high power surges and prevents blade damage or operator injury.

13 Claims, 25 Drawing Sheets

U.S. PATENT DOCUMENTS

| | | | | |
|---|---|---|---|---|
| 3,657,868 A | | 4/1972 | Cousino | |
| 3,664,103 A | | 5/1972 | McNair | |
| 3,756,000 A | | 9/1973 | Kerr | |
| 3,934,340 A | | 1/1976 | Jones et al. | |
| 3,973,378 A | | 8/1976 | Bartasevich et al. | |
| 3,978,645 A | | 9/1976 | Bennett et al. | |
| 4,012,891 A | * | 3/1977 | Steuerwald | 56/305 |
| 4,044,534 A | | 8/1977 | Day et al. | |
| 4,048,791 A | | 9/1977 | Treen | |
| 4,198,803 A | | 4/1980 | Quick et al. | |
| 4,520,619 A | | 6/1985 | Doi et al. | |
| 4,609,155 A | * | 9/1986 | Garnier | 241/30 |
| 4,651,511 A | | 3/1987 | Majkrzak | |
| 4,866,921 A | | 9/1989 | Nagashima et al. | |
| 4,890,448 A | | 1/1990 | Doi | |
| 4,894,979 A | * | 1/1990 | Lohrentz | 56/305 |
| 5,123,237 A | | 6/1992 | Lutz | |
| 5,201,168 A | | 4/1993 | Jenson | |
| 5,241,811 A | * | 9/1993 | Bolinger | 56/310 |
| 5,251,428 A | | 10/1993 | Gay | |
| 5,261,217 A | | 11/1993 | Allen | |
| 5,372,001 A | | 12/1994 | Olson et al. | |
| 5,398,490 A | | 3/1995 | Allen | |
| 5,557,913 A | | 9/1996 | Metz | |
| 5,572,857 A | * | 11/1996 | Barrett | 56/298 |
| 5,644,904 A | | 7/1997 | Olinger | |
| 5,706,639 A | | 1/1998 | Metz | |
| 5,732,539 A | | 3/1998 | Loftus | |
| 5,845,474 A | | 12/1998 | Loftus | |
| 5,875,624 A | | 3/1999 | Olinger | |
| 5,937,622 A | * | 8/1999 | Carrier et al. | 56/11.9 |
| 6,062,012 A | | 5/2000 | Suarez et al. | |
| 6,076,265 A | | 6/2000 | Huang Lo | |
| 6,170,241 B1 | * | 1/2001 | Shibilski et al. | 56/11.9 |
| 6,305,154 B1 | | 10/2001 | Yang et al. | |
| 6,314,707 B1 | | 11/2001 | Ryan | |
| 2002/0035827 A1 | | 3/2002 | Yang et al. | |

* cited by examiner

Fig. 1 -- Prior Art --

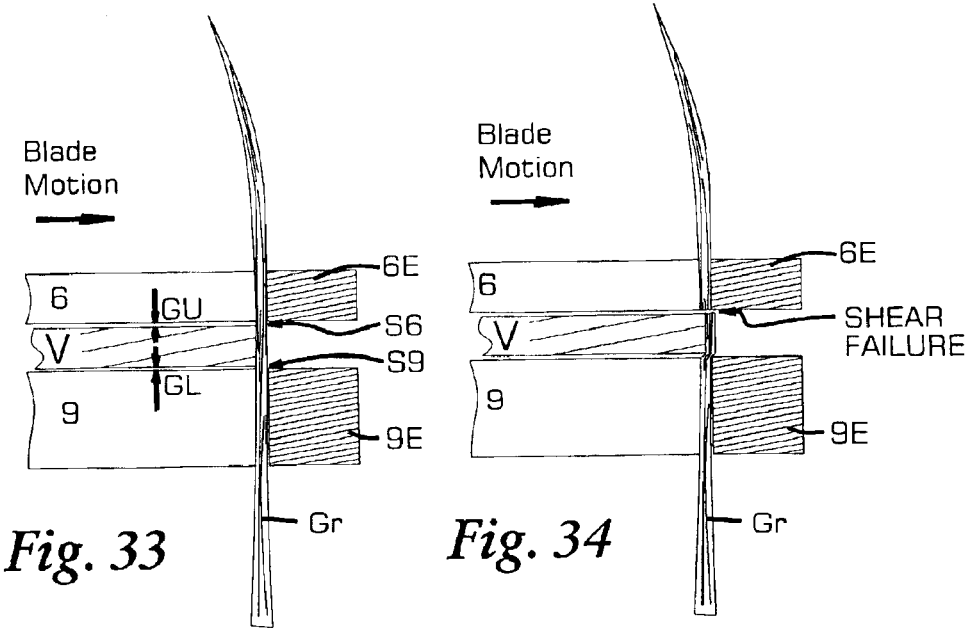
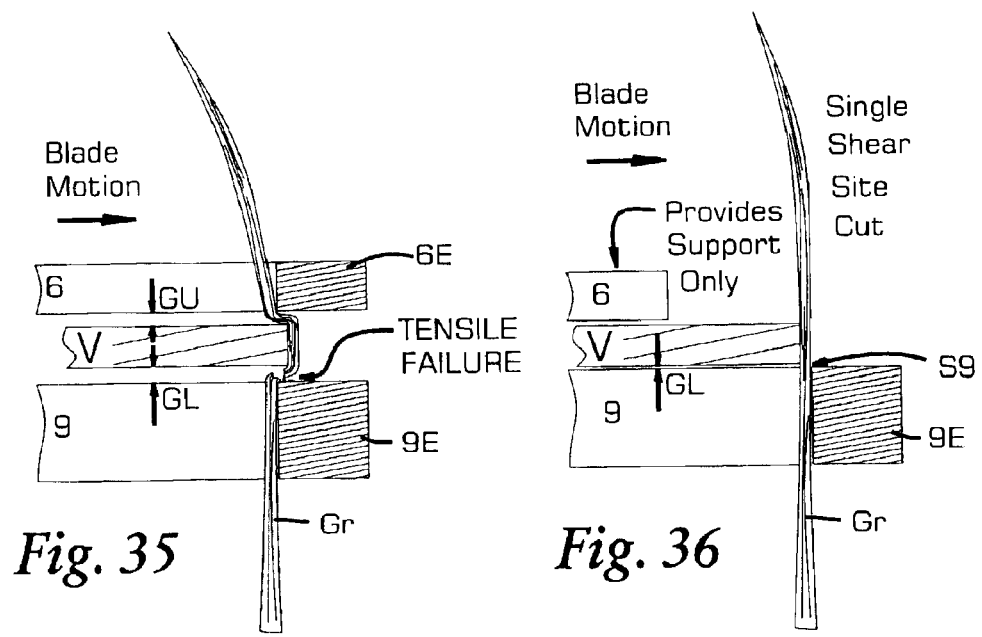

LOW ENERGY SICKLE MOWER AND SYSTEM USING CONTROLLED GAP THIN BLADE SHEAR PROCESS AND TORQUE MANAGEMENT

This invention relates to agricultural and lawn care machines, and in particular, to novel teachings for construction, design and operating methods for sickle mowers using a low energy thin blade controlled gap shear process with torque management to shear grass or the equivalent using a relatively dull moving blade aided by one or two stators.

BACKGROUND OF THE INVENTION

In the United States and many other areas of the world, grass covers millions of homesteads, private and public lawns, and mowed areas. Cutting this grass is an activity that figures in local economies and air quality worldwide. In the US alone, $30 billion is spent annually on lawn care, more than any other crop, and turf grass is estimated to cover 50 million acres (202,000 square km), twice the land area of Pennsylvania, about half of it being residential (US News & World Report 28 Oct. 1996). Among the 100 million households in the USA, many are landowners who regularly cut the grass around their homes and ranches, and over 9 million lawn mowers are sold annually in the USA. Most of these machines are powered by small internal combustion (IC) engines under 5 HP (3.7 kW) that are relatively unsophisticated and are a significant source of volatile organic hydrocarbons (VOCs), carbon monoxide (CO), and particulate emissions. Deemed a significant contributor to air pollution nationwide, the US Environmental Protection Agency (EPA) and the California Air Resources Board (CARB) have issued new rules to restrict exhaust emissions for four stroke internal combustion engines that are typically used to power lawn and garden mowers.

Grass presents unique problems for the cutting arts. Most turf grasses found on lawns in the US are descended from tough grasses that have evolved to grow on prairies or savannahs in other parts of the world. Unlike most cutting done in the industrial arts, mowing grass is a complex process and involves a number factors. The materials to be cut are biological, unpredictable, arrayed at different angles, differing in moisture content, and mechanical characteristics from grass blade to grass blade. Plant characteristics vary from plant to plant in a single lawn or field, and from region to region. Differing individual characteristics for blades of grass include different elastic moduli, mass densities and thicknesses. This affects the specific failure modes for a grass blade under a cutting stress, and not all types of grass or conditions will allow for the same cutting behavior. Grass products tend to be wet internally, full of sticky substances such as glues and other proteins. The substrate for the grass to be cut can influence cutting efficiency and blade life and can vary from loamy or sandy soils to claylike or muddy conditions. Material buildup on cutting surfaces and associated components is a well known problem, and mower operator behavior can be unpredictable. The cutting process must occur satisfactorily the first time, on the first mower pass, and with a high degree of quality. Further, in many cases, there is a significant amount of cut material, often moist or wet, to be disposed of on the cutting field or into a receptable or bag.

Three different machines are typically used to cut turf grass lawns and similar applications: reel-type mowers, rotary mowers, and sickle mowers.

In reel mowers, grass is cut by scissors-like shearing action of a series of curved spiral-wound blades mounted on a reel. The spiral wound blades orbit a common axis, and act against a fixed straight blade or bed knife extending parallel to the common axis. The shearing action of reel mowers results in a clean cut and a smooth, green lawn surface with less tear damage to individual blades of grass. But reel mowers have many disadvantages: they cannot cut all types of grasses or weeds or light brush and they often need adjustment and sharpening. Relatively heavy, they are hard to maneuver and cannot cut grass close to walls or trees. They have cumbersome and expensive drive trains, owing to the relatively slow rotational speed of the reel and the horizontal orientation of its rotation axis. Reel mowers also cannot cut many types of plant stalks, including dandelion seed stalks, and are generally only used for short mowing heights, e.g., under 1 inch (2.54 cm) Ref: Guidelines for Professional Turf and Groundcover Management, Jay Deputy, Landscape L-11, CTAHR, University of Hawaii at Manoa Cooperative Extension Service, October 2000, pp. 1–6. They are more costly and require more maintenance and operator knowledge for successful mowing. Reel mowers constitute perhaps 3% of all lawn mowers in the US, and are mostly used by professional turfgrass maintenance personnel where a large capital expenditure for purchase, and increased maintenance is more readily tolerated. Furthermore, the shearing action used by reel mowers comes at the expense of high running friction between the spiral blades of the reel and the straight stationary blade that it contacts, due to the strong clamping force (inter-blade bias) needed to maintain successful shearing action, much as one endeavors to keep each blade of a pair of scissors tightly applied against one another to get a good cut. With component wear, some adjustments are typically needed to maintain true shearing action.

Reel mowers are also extremely limited in their ability to handle upsets from obstructions and non-negotiable plant stalks, resulting in frequent jamming. For this reason, a high reserve torque is needed to drive the reel, and in spite of that, operator intervention is still often needed when mowing rough lawns, meadows or light brush.

Rotary mowers cut grass by the action of a rapidly turning or orbiting pitched sharp blade at the end of a vertical driven shaft or disc. Tangential velocity of these sharp blades can reach 27 m/s or 60 miles/hour, and a high tangential speed is required for a successful cut. Rotary mowers are the market volume leaders in lawn cutting equipment, and are advantageous in that they can be used in grass or weeds or light brush of almost any height, and they are relatively inexpensive. However, they are inherently dangerous and represent a domestic hazard of the highest order for operators, producing thousands of injuries each year, many of a serious nature. Rotary mowers will cut through most objects which come into contact with its rotating blade, and will throw hard objects such as rocks, stones or other debris that come into the path of the blade rotation. Manufacturers have used housings or skirts surrounding the rotary blade path, but the skirt must be shallow at the forward end so as to be open to incoming grass without bending the grass excessively, and must include a discharge chute or via. Often the discharge chute and the nearby housing become clogged with grass clippings, rendering the mower useless. This tempts operators to either tilt the mower to expose the underside for cleaning or inspection, or to actually attempt to clean the affected area while the mower is running, both inviting severe and immediate danger. Many operators are injured by deliberate or accidental placement of a foot under this housing, wherein the foot, or merely a shoe lace or pant cuff projects sufficiently so as to be caught by the moving blade. This can happen when pushing or negotiating the mower over uneven ground, and particularly on wet hillsides. The rotating blade is a major structural element and possesses in a dangerous way substantial rotational inertia, due to its own radial extent and weight, and also due to the rotational inertia of any blade support disc used, and that of the crankshaft, piston(s) and valvetrain of any internal combustion engine used or that of the heavy motor armature of any electric motor used. If the rotary mower is used inappropriately, such as has been done by some to lift it in the air to trim hedges and the like, it can maim and kill in seconds.

Furthermore, rotary mowers are basically crude and destructive chopping devices which rely on impact cutting or tearing of the grass rather than shearing it cleanly, causing plant damage which in turn causes vulnerability to disease, moisture loss and pests, and causes the lawn to have a brown cast after mowing. Rotary mowers require blade sharpening, and emit loud noise, mostly due to the high IC engine output required and due to windage losses, as the pitched blade is customarily designed to be used to create a strong updraft to insure grass blades are straightened and vertical for subsequent cutting. The tensile failure cut given by a rotary mower requires more energy, and the high torque capacity prime movers needed for most mowers generally, are wasteful, as discussed below. Very little of the applied power in either type of mower goes toward grass cutting itself, and the rotating blades used need periodic sharpening.

Sickle mowers are used successfully in many farming applications such as to harvest tall grains like wheat, and beans, and operate in a way analogous to a barber's electric clippers, by employing, in various possible arrangements, rows of teeth that slide by each other or move relative to one another. This provides an effective cutting action without moving a fixed blade through open space as with the rotary mower. In this sense, the term sickle mower could be interpreted by some as a misnomer.

Various sickle mower arrangements and cutting techniques are disclosed in the prior art, among them, U.S. patent application Publication No. U.S. 2002/0035827 A1 and U.S. Pat. No. 6,305,154 to Yang et al.; and also U.S. Pat. No. 6,314,707 to Ryan; U.S. Pat. No. 6,076.265 to Huang Lo; U.S. Pat. No. 6,062,012 to Suarez et al.; U.S. Pat. Nos. 5,875,624 and 5,644,904 to Olinger; U.S. Pat. Nos. 5,845, 474 and 5,732,539 to Loftus; U.S. Pat. Nos. 5,706,639 and 5,557,913 to Metz; U.S. Pat. Nos. 5,398,490 and 5,261,217 to Allen; U.S. Pat. No. 5,372,001 to Olson et al.; U.S. Pat. No. 5,201,168 to Jenson; U.S. Pat. No. 5,123,237 to Lutz; U.S. Pat. No. 4,866,921 to Nagashima et al.; U.S. Pat. No. 4,651,511 to Majkrzak; U.S. Pat. No. 4,198,803 to Quick et al.; U.S. Pat. No. 4,048,791 to Treen; U.S. Pat. No. 4,044, 534 to Day et al.; U.S. Pat. No. 3,978,645 to Bennett et al.; U.S. Pat. No. 3,973,378 to Bartasevich et al.; U.S. Pat. No. 3,934,340 to Jones et al.; U.S. Pat. No. 3,756,000 to Kerr; U.S. Pat. No. 3,664,103 to McNair; U.S. Pat. No. 3,657,868 to Cousino; U.S. Pat. No. 3,656,285 to Carlson; U.S. Pat. No. 3,641,752 to Ipbach; U.S. Pat. No. 3,633,346 to Thomas J. McMullen; U.S. Pat. No. 3,397,524 to W. D. Hofer; U.S. Pat. No. 3,242,659 to O. L. Dunlap; U.S. Pat. No. 3,006,129 to V. A. Sayre; U.S. Pat. No. 3,006,126 to A. D. VIVERETTE; U.S. Pat. No. 2,793,487 to T. H. WOBERMIN; U.S. Pat. No. 2,714,280 to S. D. Baker; U.S. Pat. No. 2,186,126 to W. H. Roll; U.S. Pat. No. 2,079,945 to W. H. Manning; U.S. Pat. No. 1,775,421 to R. O. Clark; U.S. Pat. No. 1,647,867 to E. O. Hutsell; U.S. Pat. No. 1,258,671 to G. O. Greenfield; U.S. Pat. No. 845,547 to R. W. Hathaway; U.S. Pat. No. 765,126 to O. R. Chaplin; and U.S. Pat. No. 153,755 to E. W. Crawford et al; all of which are hereby incorporated herein in their entirety.

The cutting action of a sickle mower is safer, since the sickle blades move transversely against one another, and safety can be afforded by making the spaces between teeth relatively small to as to generally allow only grass and small brush to be entrained therein. Sickle mowers tend to use less input energy per cut than reel or rotary mowers, because little or no energy is expended for actions such as circumferentially and upwardly moving grass, re-cutting grass, and moving air; and in the case of a rotary mower, there is no exhaust throw of grass and secondary cutting products out a chute or via (see FIGS. 1 and 2 below).

However, prior art sickle mowers have important limitations. Sickle mowers almost always use multiple blades, e.g., 20 blades, and it is usually essential to maintain sickle blade sharpness for proper operation, because there is less reliance or little reliance on impact cutting, as is done in rotary mowers. Sharpening of the multiple sickle blades is relatively difficult, and usually requires specific component re-assembly beyond the capability of most consumers. Blade lifetimes are often limited and sickle bars containing the blades are often heavy and cumbersome. Also, one often cannot obtain effective cutting for sickle mowers cutting grass, as some grass encountered on the cutting field tends to flatten or simply move in a way so as to avoid being trapped in the sickle mechanism. Sickle mowers are usually therefore often used on larger types of vegetation such as found in fields, orchards and ditches.

Grass capture considerations are vital to the success of any sickle mower. U.S. Pat. No. 3,656,285 to Carlson reviews problems of the prior art and concludes that the efficiency of a sickle mower using a toothed band or sickle blade set depends greatly on the individual characteristics of the grass blades being cut. Blades of grass that need a small amount of trimming, such as encountered when mowing a lawn regularly, are not always cut, as some blades of grass are not stiff enough to allow mechanical resistance to motion that would cause them to enter the active sickle cutter; instead, selected grass blades are pushed aside or knocked aside as the mower passes, without being cut. The solution, as seen by Carlson and others, is to bring the grass into the cutting device, and to keep it there during the cutting action, much as a barber pulls or combs hair into the path of his scissors. In the reel mower, the moving spiral blades accomplish this function; in the rotary mower, the updraft created by the rotating pitched blade(s) maintains the grass blades in a relative vertical position for cutting by blade impact. Carlson accomplishes this for a sickle mower by using an endless mowing band that comprises grass gathering clasps to urge individual grass blades into bunches to be cut, rather than bending out of the cutters' influence. Carlson's embodiments also include fixed and moving elements to keep the cutting apparatus clean and free from accumulated grass that would otherwise be thrown out the discharge chute in a rotary mower.

In the typical prior art sickle mower, there is a moving cutting blade set that moves laterally against either [1] another moving cutting blade set moving in the opposite direction; or [2] one or two or three stationary blade sets, which in this disclosure shall be called stators (see Definitions below). Between the planes established by the moving cutting blades and the stator(s) there is a dimensional or spatial gap, which tends to be large, and therefore not conducive for cutting fine grass. The large gap, discussed below, means that the actual failure mode tends to be a either: [1] tensile failure in the grass, which requires more energy to accomplish, and tends to cause grass damage as cited above; or if the sickle blade is kept sharp, [2] a knife cut, similar to an impact cut, with some grass body cleavage from the sharpness of the sickle cutting blade. For example, U.S. Pat. No. 5,845,474 to Loftus teaches use of blades that are knives, arrayable into a blade set or blade chain.

One of the important objects of this invention is to provide for a successful sickle mower for consumer use in cutting turf grass which consumes little energy and could be run with a very small IC engine or, preferably, with a small electric motor/battery set. In the sickle mower, there are challenges and considerations relating to load management and dealing with obstructions, such as thick brush, debris, sticks, or soft stalks. Up to now, single, dual and triple stator sickle cutters have operated at high reserve torque, with a prime mover (IC engine or, in theory, an electric motor) that is geared or run so as to be able to handle sharp increases in load torque during obstructions or heavy loads, without stalling. This allowed for uninterrupted operation, but the energy required basically consigned sickle mowers to use of the same size and type of relatively large and wasteful prime mover (typically a 3–5 HP IC engine) as used by reel and rotary mowers, with much of the same high energy use, high noise levels, high exhaust emissions, and high weight and complexity associated with these traditional machines. See Ref: Busey, P., and Parker, J. H. 1992. Energy conservation and efficient turfgrass maintenance, in: Waddington, D. V., Carrow, R. N., and Shearman, R. C. (eds.) Turfgrass, pp. 473–500. American Society of Agronomy, Madison, Wis.; also Ref: Fluck, R. C., and Busey, P. 1988, Energy for mowing turfgrass, Transactions of the ASAE, American Society of Agricultural Engineers 31:1304–1308.

The high reserve torque needed by prior art sickle mowers not only results in energy wasted for running the machine, but also the high transient forces developed by necessity to plow through, cut through, or otherwise eliminate obstructions as best as possible means that the cutting blades themselves, and possibly the stator(s) digits or elements as well, have to be thick and of heavy construction to withstand shocks and to able to plow into obstructions without dings or damage. This further increases the requirement for sharp blades, as they tend to be thick, and if presented to the grass on the cutting field in dull geometry, the mower stalls, fails to cut, or cuts in an impact cut regime only, which limits its effectiveness and increases required blade lateral (cutting) velocity, further increasing the energy needed to run the mower.

Also, prior art sickle mowers, operating at high reserve torque to, in effect, have the cutting blades slam their way through grass and brush, are not adapted or capable of managing non-negotiable obstructions without operator intervention, such as when the operator stops the mower and manually clears the obstruction, etc. Also, the high reserve torque applied to the sickle cutting blades virtually assures that some safety issues remain, such as the danger of severing a finger accidentally interposed between the sickle cutting blade and stator(s). Furthermore, prior art sickle mowers using a single stator tend to rely on a the outcome of a single physical failure site on a blade of grass, that is, the cut must occur on at or near the particular pinch point or line created by the cutter(s). Those with dual stators that surround the moving blade as bread does a sandwich are in reality relying on a combination of an impact cut or knife cut from fast moving cutting blades (e.g., endless cutter, single blade movement direction), and/or a tensile failure cut, such as from reciprocating blades, as the grass or brush is caught between the moving blade and the stator. The reliance on a single shear failure site changes unfavorably the cutting action kinetics, making unsuccessful cutting events more likely.

Other problems with prior art sickle mowers include: [1] the buildup of secondary cutting products or debris on cutting blades, which tends to eventually impede facile operation. Prior art teachings such as U.S. Pat. Nos. 5,557,913 and 5,706,639 to Metz disclose "C-shaped, channel-like" cutting blades or equivalent cutting elements, but none teach how to reduce troublesome buildup of secondary cutting products (grass bits, resins, etc.) from accumulating on those blades; [2] lingering problems of conditioning the grass to not bend or move out of the way of the moving cutter blades; [3] energy wasted by the necessity of having high blade numerical redundancy, whereby energy is wasted by having a large number of blade passes in cutting zones for a given amount of forward motion of the mower, to mask or compensate for unsuccessful cutting events. As a result, no commercially successful low energy sickle mower system for consumer use in caring for turfgrass has been heretofore devised.

It is therefore one objective of this invention to provide for the creation of a low energy sickle mower and system for consumer use that does not require high reserve torque or high power capacity prime movers, and which is operator-safe, efficient, quiet, lightweight and easy to maneuver;

It is another objective of this invention to provide a sickle mower system utilizing a low energy non-interference true shear process using a dull blade for low maintenance requirements;

It is another objective of this invention to provide embodiments giving rip-free true shearing of grass using a dull thin blade moving between two stators or by one stator to improve lawn quality and reduce required energy for cutting, whereby shear cutting occurs at an upper or at a lower leading edge of cutting blade moving laterally across the cutting field in relation to mower forward motion, providing two possible twin possible shear failure sites for grass to be cut, improving cutting action kinetics and the probability of successful cutting events;

It is another objective of the invention to reduce energy wasted by the necessity of having high blade numerical redundancy, whereby energy is saved by using a minimum number of blade passes for a given amount of mower forward motion;

It is yet another objective of this invention to improve blade cleanliness and aid proper sickle operation by introducing clean-blade geometries and processes;

It is yet another objective of this invention to improve cutting action kinetics relative to prior art sickle mowers by orienting the mower for best possible results and conditioning the grass for the best possible probability of cutting success, reducing the probability that grass will move or bend out of the influence of the sickle cutter(s);

It is yet another objective of this invention to allow for load leveling or load phase shifting to reduce further needed applied power and torque;

It is still further another objective of this invention to use the benefits of the non-interference shear process to allow for torque management and blade clearing, including motor torque monitoring and clearing the cutting blade(s) of obstructions, secondary cutting products, and debris by [1] freeing and rejecting, or [2] kicking out obstructions, without requiring high energy and high reserve torque to be applied thereto, and without power surges or blade damage.

Many other important objectives and differences from the prior art will become apparent upon reading the remainder of the specification and the appended claims.

SUMMARY OF THE INVENTION

This invention provides for a low energy consumption controlled gap thin blade shear process that uses a thin high speed blade chain that guidingly moves dull thin cutting blades past a stator. The cutting blades do not need to be sharp, as they rely on shearing action that is afforded in part by a total controlled gap Z between the dull cutting blades and the stator. Unlike most shear processes such as found in scissors, the blades and stator are not biased or pressed together as they move past one another. The low energy sickle mower that results can be controlled by a torque management system assisted by a electronic control module. The moving cutting blades are mounted on a blade chain, and moved by a motor controlled by the torque management system for optimum efficiency, and for intelligent operation, including blade reversing and reverse motion for clearing obstructions, cleaning the blade, and limiting peak torque for safety and lower energy use. Complex or creative strategies can be used for obstruction kickout and blade cleaning, such as jitter or reciprocation of the blades. A user interface gives mower status, such as when an obstruction is present, or when the mower speed is inappropriate. The stator itself can be set into motion, such as a jitter, for improved performance.

The invention teaches how to make and use a low energy sickle mower using a controlled gap thin blade shear process to cut grass, with the low energy sickle mower comprising a cutting deck (D) comprising a dull cutting blade (V) and a stator (S), and with the dull cutting blade and the stator each so sized, shaped, formed and finished, and the dull cutting blade so drivingly positioned, such that the dull cutting blade is guidingly supported by the stator and shearingly passes by the stator with a total controlled gap (Z) between the dull cutting blade and the stator; and with the stator comprising at least one stator element (SE) so formed and sized as to provide a shear failure site for the grass.

The low energy sickle mower can additionally comprise an upper stator (6) and a lower stator (9), and the dull cutting blade can additionally be so shaped and formed so as to further comprise an upper leading edge (K1) and lower leading edge (K9), wherein the dull cutting blade is guidingly supported by the upper and lower stators, with the upper and lower stators so sized, shaped, formed, finished and positioned such that a thickness of a cutting zone (M) formed therebetween exceeds the thickness of a blade zone (VZ) formed by the dull cutting blade upon forward motion thereof by a total controlled gap (Z); and with the upper stator comprising at least one upper stator element (6E) and the lower stator comprising at least one lower stator element (9E), with the upper stator element and the lower stator element each so formed and sized so as to provide an upper shear failure site and a lower shear failure site, respectively, for the grass upon passing of the upper leading edge and the lower leading edge of the dull cutting blade by the upper stator and the lower stator, respectively.

The low energy sickle mower can be constructed to have the total controlled gap be less than 40 mils (1.016 mm); or less than 10 mils (0.254 mm); or preferably between 1 and 5 mils (0.0254–0.127 mm). Also, the dull cutting blade can have a thickness of less than 100 mils (2.54 mm); or between 10 and 50 mils (0.254 mm–1.27 mm).

Also, the dull cutting blade can have a self-cleaning geometry comprising a gentle C shape profile, whereby accumulation of debris is reduced on the dull cutting blade. The stator can be beveled, as well, for better performance. In addition, the low energy sickle mower can additionally comprise an electronic control module and a torque management system for drivingly positioning the dull cutting blade, whereby a magnitude and direction of movement of the dull cutting blade is intelligently controlled by the electronic control module.

The low energy sickle mower can be have its cutting deck so positioned so as to have a rake angle (RA) for improved cutting, and/or additionally comprise a projection brush (X) acting upon the grass. The projection brush acts to "comb" grass just prior to cutting for better cutting performance. And, if desired, the dull blade can be augmented in structure, by adding a knife edge situated between the upper leading edge and the lower leading edge of the blade, the knife edge so sized and formed to cut grass upon forceable contact thereto.

The invention also teaches a controlled gap thin blade shear process for a low energy sickle mower for cutting grass on a cutting field, with the process comprising:

[a] Guidingly moving a dull cutting blade laterally between an upper stator and a lower stator, such that the thickness of a cutting zone (M) formed therebetween exceeds the thickness of a blade zone (VZ) formed by the dull cutting blade upon a forward motion thereof by a total controlled gap (Z) so as to achieve shearing of the grass using the dull blade.

Additionally, this process can be performed such that the total controlled gap is less than 40 mils (1.016 mm); or less than 10 mils (0.254 mm); or preferably between 1 and 5 mils (0.0254–0.127 mm). Also, the dull cutting blade guidingly moving laterally between the upper stator and the lower stator can have a thickness of less than 100 mils (2.54 mm); or a thickness between 10 and 50 mils (0.254 mm–1.27 mm).

The process step [a], guidingly moving a dull cutting blade laterally, can also comprise forward and reverse motion of the dull cutting blade, possibly including forward and reverse reciprocation of the dull cutting blade, possibly at a frequency greater than 5 Hertz.

Additionally, the process can include applying a rotating projection brush to the grass on the cutting field. The process can additionally include

[b] Moving the cutting blade laterally at a speed sufficient to create sufficient blade swipes per unit time to contact the grass protruding through any flux traps in the cutting zone during the forward motion of the low energy sickle mower.

The invention also teaches a method for torque management in a low energy sickle mower, where the blade is driven by a motor (EM) to produce either forward blade motion or reverse blade motion using a motor torque generated by a forward or reverse motor current, respectively, with possible steps being:

[a] Motor load monitoring to detect and recognize a forward torque threshold for said motor torque for a forward motion of said blade in said cutting deck;

[b] Reversing blade forward motion upon exceeding the forward torque threshold by reversing the motor current;

[c] Resuming the blade forward motion by applying the forward motor current.

[d] Reciprocating the blade motion by alternating the forward motor current and the reverse motor current

[e] Reciprocating the blade motion at a frequency of greater than 5 Hertz.

[f] Performing a backout by resuming the step [c] less than 1/10 second after step [b].

[g] Performing a kickout by resuming the step [c] more than 1/10 second after step [b], whereby an obstruction can be cleared by the reversing of blade forward motion.

BRIEF DESCRIPTION OF THE DRAWINGS

FIG. 33 shows a close-up view of a portion of FIG. 32;

FIG. 34 shows the close-up view of FIG. 33 at a later time just after shear failure of the grass, using a small controlled total gap between stators and blade, as taught by the invention;

FIG. 35 shows the close-up view of FIG. 33 at a later time just after tensile failure of the grass, using a large and/or uncontrolled total gap between stators and blade, as discouraged by the teachings herein;

FIG. 36 shows a view similar to that of FIG. 33, giving an alternate embodiment of the invention, wherein cutting occurs using a moving blade passing along a single set of lower stator elements;

DEFINITIONS

Figure 1:
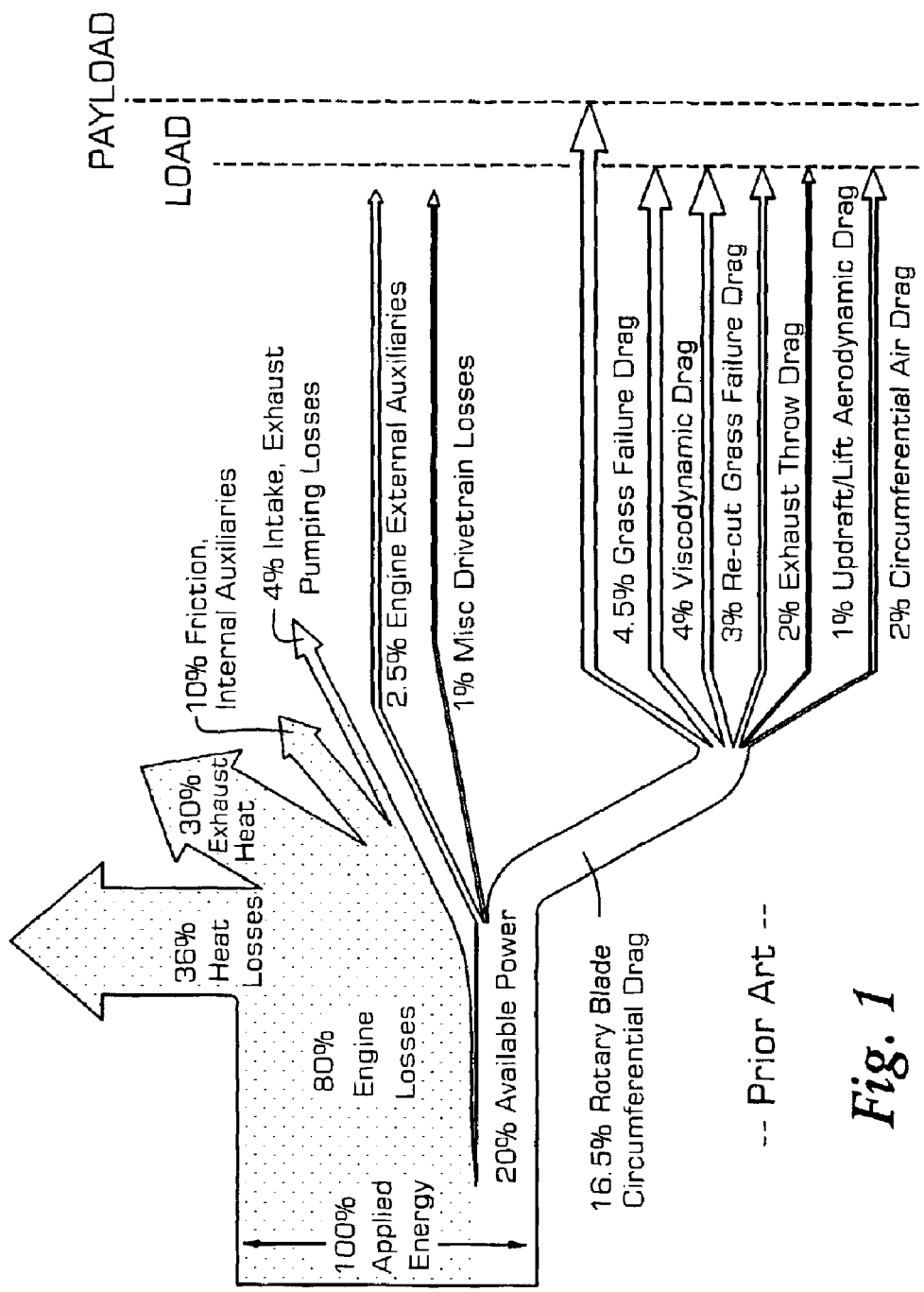
FIG. 1 shows a schematic representation of energy flows for a prior art rotary-blade mower.

The following definitions shall be employed throughout:

Anterior shall refer to a direction toward what is commonly referred to the front or forward end of the mower according to the invention, that is, the face of the mower which first meets grass when mowing, and generally away from the operator.

Backout shall refer to a reverse motion of a cutting blade to allow passive rejection or freeing of an obstruction. Motion involved in a backout can be minimal, comprising as little as a simple relief of blade apply pressure to allow the obstruction to free itself during mower forward motion.

"Blade" or cutting blade shall refer to any cutter, knife, filament, or other material body that can sever, damage, or shear grass, as defined below, and which is driven by the mower to shear grass by one stator or between two stators. This definition for blade shall include any additional structures used on or with the body of the blade such as filaments, wires, or tabs to enhance efficiency in cutting, damaging or shearing. Although the word, sickle, is used throughout this disclosure, the cutting process taught here is distinct from a simple stator-free sickle cut, and use of the word sickle herein shall not be interpreted by itself to describe actual cutting methodology.

Blade cutting plane shall refer to any finite plane created by a leading edge of a blade front face as it moves laterally across a stator during blade forward motion. The upper and lower leading edges of a blade front face can thus form two blade cutting planes, which are typically mutually parallel.

"Blade dings" shall refer to any permanent or semi-permanent deformation of a blade made as a result of contact with a material body that entered the cutting plane during blade motion inside a mower according to the invention.

Blade forward face or front face shall refer to the entire face or portion of a blade which has most potential to contact, move, or impinge upon grass directly during blade forward motion, as opposed to the blade reverse face or any blade sides which generally are not oriented for direct, or frequent contact with grass during blade forward motion.

Blade reverse face shall refer to the entire face or portion of a blade which has most potential to contact or move grass during reverse motion of the blade.

Blade set shall refer to any plurality of blades which operate in a cutting plane.

Blade tip shall refer to that portion of the blade front face which projects most forwardly in the direction of mower forward motion.

Blade zone shall refer to a volume, typically a rectangular solid, that is formed between the two finite blade cutting planes formed by the upper and lower leading edges of a blade front face during blade forward motion.

Closed flux trap shall denote a flux trap so formed and shaped that a blade tip arrives at a stator surface before the rest of a blade front face (e.g., blade midsection).

Controlled gap shall denote the maintenance and establishment of a blade-stator gap measured by the thickness of that portion of the cutting zone between a blade cutting plane and the nearest constituent projecting surface on the nearest stator. For a mower with upper and lower stators, such a controlled gap can be measured individually or summed to a total controlled gap as measured by the added controlled gaps existing adjacent the upper and lower stators; this would equal the difference in thickness between the cutting zone and the blade zone.

Cutting field shall refer to any surface on which a mower is used, from which grass blades can emerge, as well as where obstructions such as nails, sticks, garbage, rocks or the like may be present.

Cutting zone shall refer to a volume, typically a rectangular solid, that is formed by taking the volume defined by the blade zone (also typically a rectangular solid, formed by the upper and lower finite blade cutting planes), and widening it further in either direction normal to the blade cutting planes to make a wider volume that meets nearby stator surfaces.

Debris shall include all primary and secondary cutting products, and shall include bits of grass, liquid products, such as juices, saps, glues, proteins, and other entrained debris; or in the case of non-biological cutting products, any resultant matter created or released in or about the cutting plane during operation of a mower according to the invention. See obstruction.

Deck shall refer to a common assembly comprising the stator, cutting blades, and any blade chain, supporting beds, support bars, or bearings that facilitate blade motion.

Dull in the context of blade shapes shall refer blunt, flat or squared off shapes in a blade front face or blade reverse face, such as a blade possessing a blade front face that is not ground, sharpened, formed or shaped to form a point or line or curve possessing a relatively small local radius. A relatively small local radius is a small local radius that would expected to cut grass upon contact with a moving blade, as would happen with a knife or by a non-shearing process.

Electronic control module (ECM) shall include any and all programmable processors, which in turn shall include microprocessors, CPU's (Central Processing Units), or any intelligent device that performs the functions given, such as analog electrical, optical, pneumatic or hydraulic circuits that perform the same functions.

Flux shall refer to a theoretical concept in keeping with its general definition as denoting the amount of some quantity flowing across a given area (such as a unit area perpendicular to a flow of that quantity) per unit time. In the instant disclosure, the quantity can be interpreted as being blades of grass, mass of grass, or a similar summation of grass, crossing a flux trap.

Flux trap shall refer to any two dimensional area (planar or non-planar) where severing, damaging, shearing or failure of grass occurs during operation of a mower using the teachings of this invention, as grass blades protrude or cross the blade cutting plane. In this invention, a typical flux trap is formed by an area subtended by lines formed by the following: the inboard or posterior (back end) flat between stator elements; the two mutually-facing inside edges of a pair of stator elements; and the line established on the outboard or anterior (forward end) of the stator by the cutting blade tip during its forward motion.

Figures 52, 53:
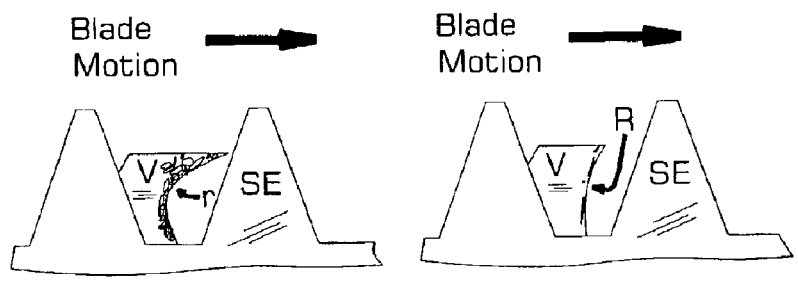
FIGS. 52 and 53 show views similar to those of FIGS. 24–26, portraying qualitatively blade cleanliness for smaller and larger blade profile radii, respectively.

Gentle C shape shall describe a blade geometry devoid of any small radius profile or convex shape which would prevent creation of a flux trap, and which has a large-radius profile sufficient to reduce accumulation of debris during operation of a mower according to the invention operated on a cutting field (See FIGS. 52, 53.)

Grass shall have a broad definition in this disclosure and shall include any plant, crop, filament or material body to be trimmed, cut, severed or shortened, and shall include vegetative biological material, dead or alive, and non-biological filaments or material bodies, as might be suggested by using the teachings of this invention for non-traditional uses such as cutting loose ends of artificial grass (e.g., Astroturf®), pile carpet or fabric, or filamentary derivations from composite materials such as fiber floors, or surfaces.

Grass blade or blade of grass shall refer to an elongate portion of grass, especially a grass blade which is long enough to extend through a cutting plane.

Guide link shall denote any structure used to guide a blade during forward or reverse motion.

Jitter shall refer to any periodic or aperiodic motion applied to or superimposed upon a material body, often with the purpose of enhancing performance in a mechanical task such as cutting, damaging, shearing, severing, clearing or avoiding obstacles, such as when a stick is entrained with or is impeding proper motion of a blade.

Kickout shall refer to reverse motion of a blade or blade set of sufficient magnitude so as to allow active pushing out or clearing of an obstruction by a blade, typically using its reverse face to push out the obstruction.

Lateral shall refer to the non-vertical direction perpendicular to the forward direction of motion of the mower according to the invention.

Leading edge shall denote the edge (line) of a blade front face which slides by or moves against a nearby stator. Upper and lower leading edges of a blade front face, when the blade is moved forward during customary mower operation, form geometrically blade cutting planes.

Motor shall refer to any motive force-generating device, whether using electromagnetic principles, as in DC and induction motors; or small internal combustion engines, such as piston engines of any displacement and turbine engines of any size; or pneumatic devices operating by converting energy of a fluid or gas under pressure to mechanical energy; or any other device that converts energy to mechanical form.

Mower in the context of the invention, shall refer to any device that uses the teachings of this invention to cut grass.

Motor load monitoring shall refer to the actions of any system which monitors, measures, controls, or feeds energy or power to a motor with the purpose of detecting changes in mechanical load on the motor or systems driven by the motor.

Obstruction shall refer to any material body, such as found in or with grass in the cutting field, that is deemed to interfere with operation of a mower according to the invention. This would include sticks, branches, pieces of wire left on the cutting field or any material body such as a human finger, where cutting or damage by a blade is difficult, impossible or undesirable.

Open flux trap shall denote a flux trap so formed and shaped such that the blade tip arrives at a stator element after the rest of, or another portion of a blade front face (e.g., blade midsection).

Posterior shall refer to a direction toward what is commonly referred to the back or rearward end of the mower according to the invention, that is, the face of the mower which is opposite the anterior end, generally near the operator.

Primary cutting products shall refer to material bodies or products, such as cut grass, resulting from or created by a single cut by a blade in motion according to the invention.

Population in the context of matching numbers of cutting blades to stator elements shall refer in a general way to the ratio of the number of cutting blades to stator elements for a given blade set at a moment when the blade set passes by the stator elements. The number may be the result of an average, such as in the case of having unequally spaced blades in a blade set.

Projection brush shall refer to any material body used to condition grass for optimal projection into a flux trap, such as a rotating brush with tines which conditions grass blades to be, on average, at least momentarily perpendicular or somewhat perpendicular, or more perpendicular, to a cutting plane.

Rake angle ($\alpha$) shall refer to the angle of a blade cutting plane with respect to a horizontal plane, or a plane most closely aligned with the ground on a cutting field.

Reverse motion shall refer to actual reverse movement of a body normally disposed to forward motion, such as when a blade set is momentarily reversed to clear an obstruction, such as by backout or kickout.

Reversing generally shall denote any deceleration, including momentary deceleration, of a body in forward motion, whether or not actual reverse motion occurs or will occur.

Secondary cutting products shall refer to material body or products, such as re-cut or mulched grass, or biological mass, resulting from a second or multiple cuts by a blade in motion according to the invention. This definition shall include all bits of grass, liquid products, such as juices, saps, glues, proteins, and other entrained biological mass created thereby. Some secondary cutting products have potential to accumulate on blades and stator elements.

Stator shall refer to any structure, such as a stationary digitated structure, that mechanically supports, and surrounds or is nearby or adjacent to a cutting blade. By its positioning and shape, it can help define a cutting zone. The elements of a stator, especially one or more stator digits or stator elements can optionally help form a flux trap, and can optionally guide a blade in motion across the cutting zone. The stator can move, rather than be stationary, e.g., it can be made to jitter, vibrate, reciprocate, etc. to increase mower performance.

Stator element or stator digit shall refer to those portions of a stator that typically protrude from a stator base or stator posterior portion, and help guide a blade in motion across a cutting zone and by their stationary or somewhat stationary disposition, cause grass to undergo destructive shear upon contact of the grass by a blade in forward motion when the grass protrudes through a flux trap.

Swipe shall refer to hypothetical or real movements of a blade across a flux trap, and can be used here to describe multiple movements by multiple blade passes across a flux trap during protrusion of a body of grass into the flux trap.

Trailing edge shall denote the edge (line) of a blade reverse face which slides by or moves against a nearby stator. Upper and lower leading edges of a blade reverse face, when the blade is moved in reverse during reverse mower operation, can form geometrically blade cutting planes.

DETAILED DESCRIPTION OF THE INVENTION

Now referring to FIG. 1, a schematic representation of energy flows for a prior art rotary-blade mower is shown. In this representation, an attempt is made to illustrate generally energy flows for a prime mover such as a four stroke or four cycle internal combustion (IC) engine driving a rotary blade mower process, starting with the release of chemical energy (i.e., burning liquid fuels) shown as "100% Applied Energy." The actual numbers for the energy flow proportions are illustrative only, and can vary from mower to mower, and are subject to field conditions, and other factors. As an example, from gasoline or similar light liquid fuels, it can be expected that given typical refinery compositions, that one can obtain an amount of chemical energy of about 115,000 BTU/gallon or 459,000,000 Joules/liter.

Much of this chemical energy, converted mostly to heat, never reaches the drivetrain or mower process in the form of mechanical energy. Engine (energy) losses from a prime mover, derived from an Otto, Rankine, Diesel, Stirling, or other thermodynamic cycle or process (not shown) supported by this release of chemical energy is typically 80% as shown ("80% Engine Losses") on the left side of the figure. This occurs mostly as a consequence of the Second Law of Thermodynamics, an expression of a fundamental limitation on the amount of energy it is possible to derive from such a thermodynamic engine process, and not a direct measure of engine quality or design. Waste heat liberated to the environment is shown, specifically as heat given off by the engine, through cooling fins and/or a water jacket (36%), and by the engine exhaust gases (30%). The rest of the energy is presented to a piston face or the equivalent, giving what is known by automotive engineers as indicated power.

Unfortunately, much of this indicated power never reaches the drivetrain or load or cutting process. In transporting working fluids (the incoming air/fuel mixture, and the outgoing exhaust gases) into and out of the engine, some indicated power is dissipated through pumping losses associated with the work done during the intake and exhaust strokes or analogous functions (4% Intake, Exhaust Pumping Losses), leaving what is called net power. Further subtracting power lost to overcome engine friction (tribological losses) and to drive internal auxiliaries, such as an engine oil pump, water pump, etc. (10%), one is left with power available at the engine output shaft, called brake power, shown as 20% Available Power, a typical final figure for unsophisticated IC engines having low volumetric displacements and low compression ratios. It is this brake power, 20% of the initial chemical energy consumed, that is available to drive mower accessories and the mower load.

But for prior art rotary mowers, very little of this 20% energy remaining is actually applied to the cutting of grass. One must subtract energy going to engine External Auxiliaries, such as an ignition dynamo, cooling fan cages, governor blowers, any alternator or generator, etc. (2.5%), and further to Miscellaneous Drivetrain Losses (1%), such as from shaft bearings or belts. This leaves 16.5% of the initial energy left to drive the rotary blade, and it is used to overcome Rotary Blade Circumferential Drag, as shown. This circumferential drag on the rotary blade is the actual useful load (shown, LOAD) for the engine, but as can be seen, many non-essential processes still must be supported by this load.

With the rotary blade approaching speeds of 60 Miles/ hour (27 m/s) as mentioned, there are significant windage losses. There is substantial Circumferential Air Drag (2%), as well as Updraft/Lift Aerodynamic Drag (1%) as shown due to the pitch and/or pitched shape of the rotary blade(s) used to create the needed air updraft as mentioned above. There is also drag associated with the work needed to forcefully throw the cut grass and debris out of the rotary blade area, typically out an exhaust chute or via, shown here as Exhaust Throw Drag (2%). Then there is work associated with re-cutting grass already cut, as freshly cut grass is entrained, typically in mid-air, inside the skirt housing the rotary blade (3% Re-cut Grass Failure Drag) and also the Viscodynamic Drag (4%) associated with frictional losses incurred trying to spin a rotary blade and any support disc in the midst of blades of grass, which resist that motion and typically become wet upon being cut.

As shown, this leaves only 4.5% of the input energy devoted to Grass Failure Drag—the actual work done in impacting the grass to the point of cutting or failure (shown, PAYLOAD). Put another way, if the energy used in the typical rotary engine process were hypothetically applied to this grass failure process alone without these attendant losses, one would need $1/22$ of the energy now used for rotary engine mowers, with a similar decrease in exhaust emissions, noise, etc. Given all the losses shown, it is no surprise to some that up to a 5 HP (3.73 kW) engine is often needed for the process, even though many know and remember that in principle, grass mowing can be done manually with a reel mower with moderate effort so long as the grass is not too thick or too high. The high reserve torque needed for this lossy process sometimes is used tragically to maim and and injure, as mentioned.

Figure 2:
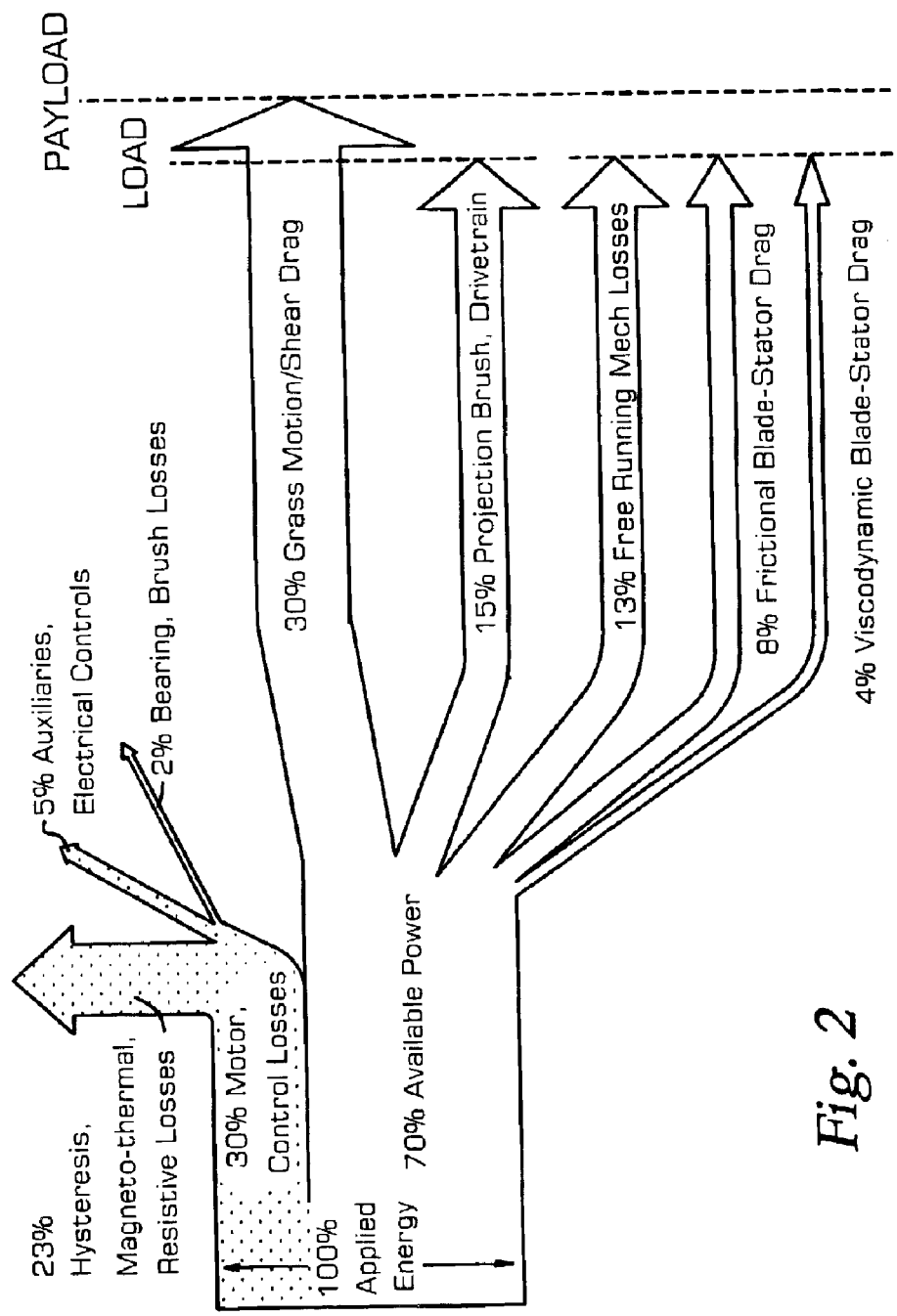
FIG. 2 shows a schematic representation of energy flows for a low energy sickle mower according to the invention.

In contrast, referring now to FIG. 2, a schematic representation of energy flows for a low energy sickle mower according to the invention is shown, where, because of the lower operating energies required, a motor and battery set (not shown) constitute the prime mover for a preferred embodiment. Applied Energy is again shown on the left side at 100%, which for an embodiment envisioned, is approximately 240 watts (W) battery power.

This 240 watts of battery power is applied to a motor and motor controls, resulting in well known Hysteresis, Magneto-thermal and Resistive Losses shown at 23% that are encountered in the motor windings and any surrounding magnets or ferrites. (Ref: Basic Electricity, US Bureau of Naval Personnel, $2^{nd}$ Ed., © 1970 Dover Publications, New York). This is meant as an average approximate figure for illustrative purposes, as are the other energy flows given here. As with any electric motor, the penalties associated with a typical thermodynamic cycle such as given above in FIG. 1 are absent. The load due to the overhead of Auxiliaries and Electrical Controls (5%) is shown, as well as motor Bearing and Brush Losses of 2%, bringing the total Motor and Control Losses to 30% as shown. Electrical controls, including powering a electronic control module and a user interface, e.g., LED display(s), are discussed below. This leaves 70% Available Power as shown, or about 168 watts, to be applied to the low energy sickle mower load (shown, LOAD) in the form of mechanical energy.

This mechanical energy is applied to Free Running Mechanical Losses of 13% as shown (middle right), a large category which includes miscellaneous bearing losses; gearing losses due to any final reduction gearing between the motor and cutting blade chain or belt; and frictional losses from sprockets or pulleys. Then there are energy losses due to the motion of the moving cutting blade passing beside or inside the stator(s). For a twin stator embodiment as disclosed below, there is, due to the slowing effect of the accumulation of water, plant oils, resins and small particles on the cutting blades, a Viscodynamic Blade-Stator Drag of 4% as shown (bottom), as well as a Frictional Blade-Stator Drag of 80%, which can include drag due to close contact of a moving blade with stator elements, or bearing drag from the mechanical support that a stator or stators provide to the cutting blade(s), with both hydrodynamic and dry components, respectively.

Another 15% of the applied energy goes, in a preferred embodiment, to a Projection Brush and any associated Drivetrain as shown, including drivetrain frictional losses, used to condition the blades of grass using a projection brush to achieve a higher distribution of grass blades with a somewhat upright orientation for improved cutting probabilities.

This leaves approximately 30% of the input energy to be applied to Grass Motion/Shear Drag, the actual work associated with backing up grass to contact any stator elements, shearing the grass to a failure point, and the incidental energy expended tossing it aside (shown, PAYLOAD). This cutting process, as described below, is far more efficient and focused on grass cutting to a much larger extent, rather than driving unnecessary processes like windage losses and exhaust throw.

Figure 3:
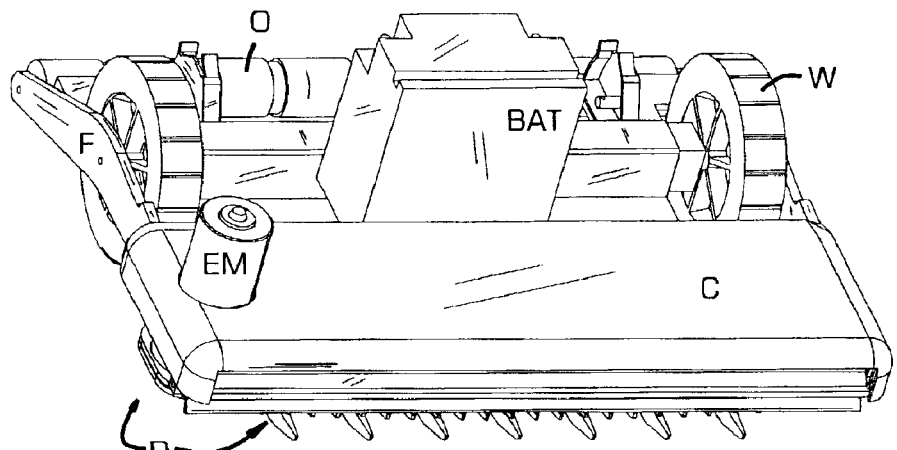
FIG. 3 shows an oblique-angle anterior top surface view of a low energy sickle mower according to the invention.

Now referring to FIG. 3, an oblique-angle anterior top surface view of a low energy sickle mower according to the invention is shown. The low energy sickle mower comprises a frame F, a small posterior portion of which is shown. Frame F comprises a structure that provides support and alignment for major assemblies, such as wheels W and rollers O. The low energy sickle mower comprises a cutting deck D, which is shown partially obscured by a front cover C as shown. Wheels W and rollers O serve to rollingly guide the mower across a cutting field and orient the mower and its cutting deck D in a desired manner. A handle, not shown, is typically grasped by the operator to push or guide the mower over a cutting field in a forward direction, shown generally downward on the page for this figure. Supported by the frame F or associated structures (not shown) is an electrical storage battery pack BAT, which provides electrical power to an electric motor EM. Motor EM drives moving portions of the cutting deck D, and an optional rotating brush, described below. It may also be used to provide a self-propel or assist to wheels W in helping drive the mower forward on the cutting field, using mechanical arrangements well known to those with ordinary skill in the mechanical arts.

Figure 4:
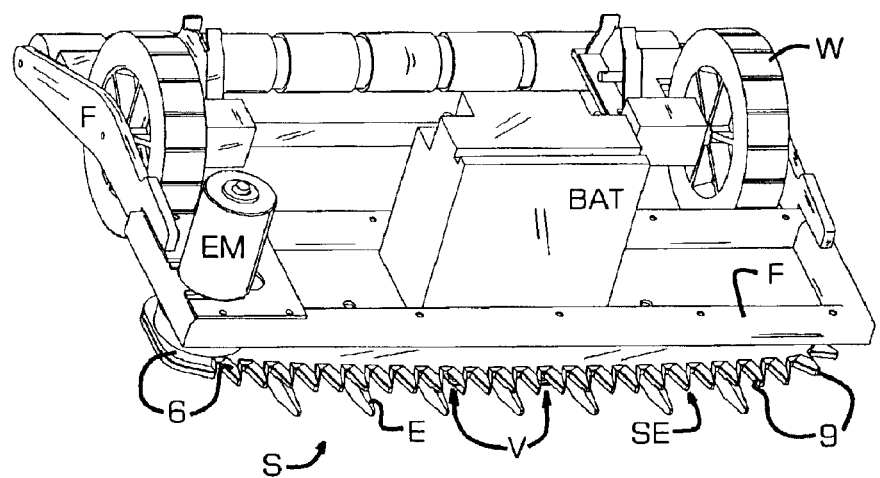
FIG. 4 shows a view similar to that of FIG. 3, but with a front cover removed to reveal cutting blades and stator elements.

Now referring to FIG. 4, a view similar to that of FIG. 3 is shown, but with front cover C removed to reveal cutting blades and stator elements inside the cutting deck D. As shown and further clarified below in later figures, cutting deck D comprises a stator S, which comprises a plurality of stator elements SE, which resemble fingers or digits and protrude anteriorly toward the cutting field to be mowed. Stator S in this preferred embodiment in turn comprises an upper stator 6 and a lower stator 9 which in this embodiment resemble flat plates and mechanically and aligningly support, and physically surround, at least one moving cutting blade V (hereinafter simply blade or blades V). As shown below, blade V is moved by indirect action of motor EM to exhibit either a reciprocating motion, or a unidirectional lateral motion across the cutting deck D, which for this preferred embodiment, is from left to right on the page. With front cover C removed, anterior portions of frame F are visible, shown circumscribing in a way battery pack BAT. Optional ribs E are affixed to, associated with, or integral with lower stator 9, and can serve to untangle or otherwise condition grass for better cutting probability at the active anterior (front facing) side of cutting deck D. An electronic control module (ECM) and any associated circuit boards are not shown, and can be affixed to a mower structure such as frame F or associated structure.

Figure 5:
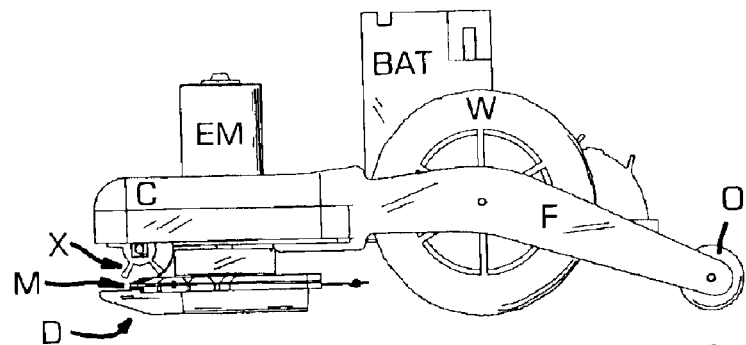
FIG. 5 shows a side surface view of a low energy sickle mower according to the invention, additionally comprising an optional projection brush.
Figure 6:
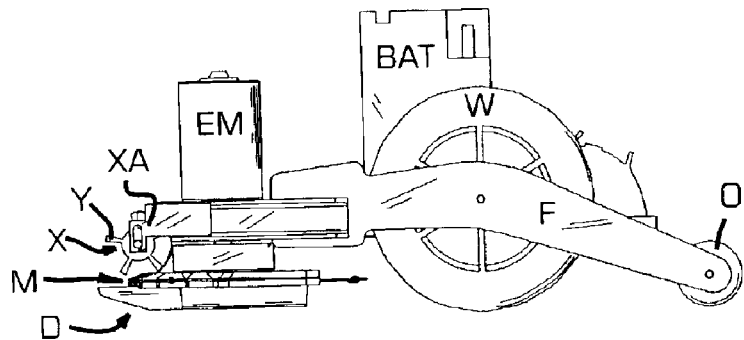
FIG. 6 shows the side surface view of FIG. 5 with a front cover removed.

Now referring to FIGS. 5 and 6, side surface views of a low energy sickle mower according to the invention are shown, where the mower additionally comprises an optional projection brush. FIG. 6 shows the side surface view of FIG. 5 with a front cover C removed. As shown, the posterior portion of the mower is to the right side in the figure, with frame F again shown supporting rollers O, wheels W, battery pack BAT, and motor EM. Additionally, supported in a manner known in the mechanical arts by frame F is projection brush support arm XA, which in turn bearingly supports projection brush X. Projection brush X serves to sweep or brush incoming grass advantageously into the cutting deck D, as will be described. Projection brush X is shown in cross section, and extends for most of the anterior width of the mower, wherever cutting deck D is open for active cutting. Projection brush X comprises projection brush tines Y as shown, which individually push and align grass for cutting by a cutting zone M inside cutting deck D as shown.

Figure 7:
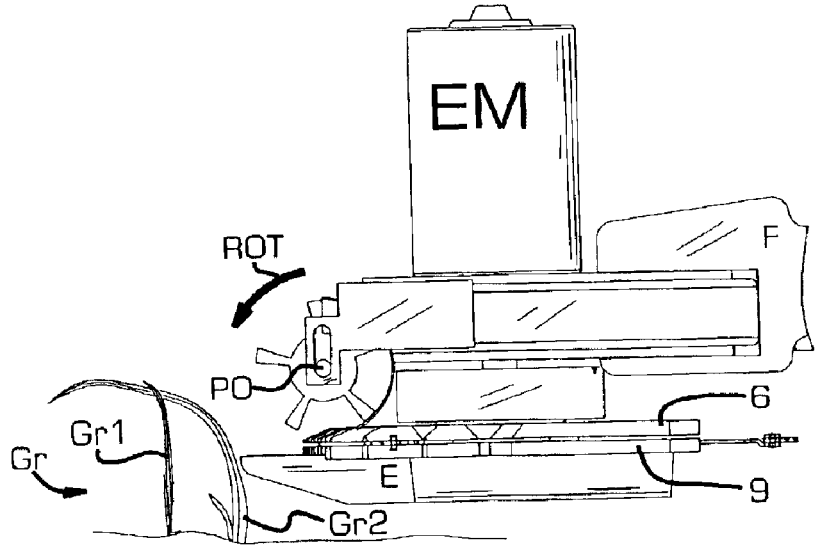
FIG. 7 shows a close-up side surface view of an anterior portion of the low energy sickle mower of FIG. 6, demonstrating action of the projection brush upon grass.

Now referring additionally to FIG. 7, a close-up side surface view of an anterior portion of the low energy sickle mower of FIG. 6 is shown, demonstrating action of the projection brush upon grass. A rotation direction ROT, shown counterclockwise, is shown for the projection brush X. Projection brush X can comprise a nylon brush with plastic tines Y, that can take the form of rods or needles, e.g., commonly available extruded polymer rope 12 mils (0.3 mm) thick. Any non-destructive brush that will urge grass to an advantageous position without snagging can be used; for this embodiment, it was found preferable to use 3–5 tines circumferentially over 360 degrees, with staggered sets of tines repeated over the anterior width as necessary. The center of projection brush X, shown as projection brush rotation axis PO, is preferably centered over the area of cutting zone M and its associated flux trap, as described below. Cutting deck D is now shown with it constituent upper stator 6 and lower stator 9, which resemble flat plates, are digitated (forming stator elements SE shown elsewhere) and surround cutting blade set or blade V like bread slices around a sandwich, giving blade V mechanical support and, in this embodiment, providing for definition of a cutting zone M, as described below and given in the definition section for Stator.

To demonstrate action of the projection brush X, representative grass Gr is shown to illustrate operating principles, with specific blades of grass, namely grass blade Gr1 and grass blade Gr2, shown arrayed at different forward points on a cutting field beneath the mower. Grass blade Gr1 is shown further from the cutting zone M of the cutting deck D of the low energy sickle mower than is grass blade Gr2, and grass blade Gr1 can be considered somewhat ideal—it is relatively stiff and upward pointing, and has a lower probability of bending out of the cutters' influence in cutting zone M. Grass blade Gr2, however, is shown on the figure to be less stiff, and already exhibiting some bend away from the influence of cutting deck D.

Now referring to FIG. 8, the same close-up side surface view as FIG. 7 is shown, but at a later time and displaced forwardly upon the grass Gr. Specifically, grass blade Gr2 is now impinging upon cutting zone M, and because of the action of projection brush tines Y rotating in the rotation direction ROT as shown, grass blade Gr2 is now drawn into and biased toward cutting zone M, increasing greatly its probability of undergoing shear failure inside cutting deck D. This can be instrumental in reducing the number of swipes needed for blades V as described below. Further discussion of the effects of the projection brush are given below under the discussion relating to FIGS. 45 and 46.

Figure 9:
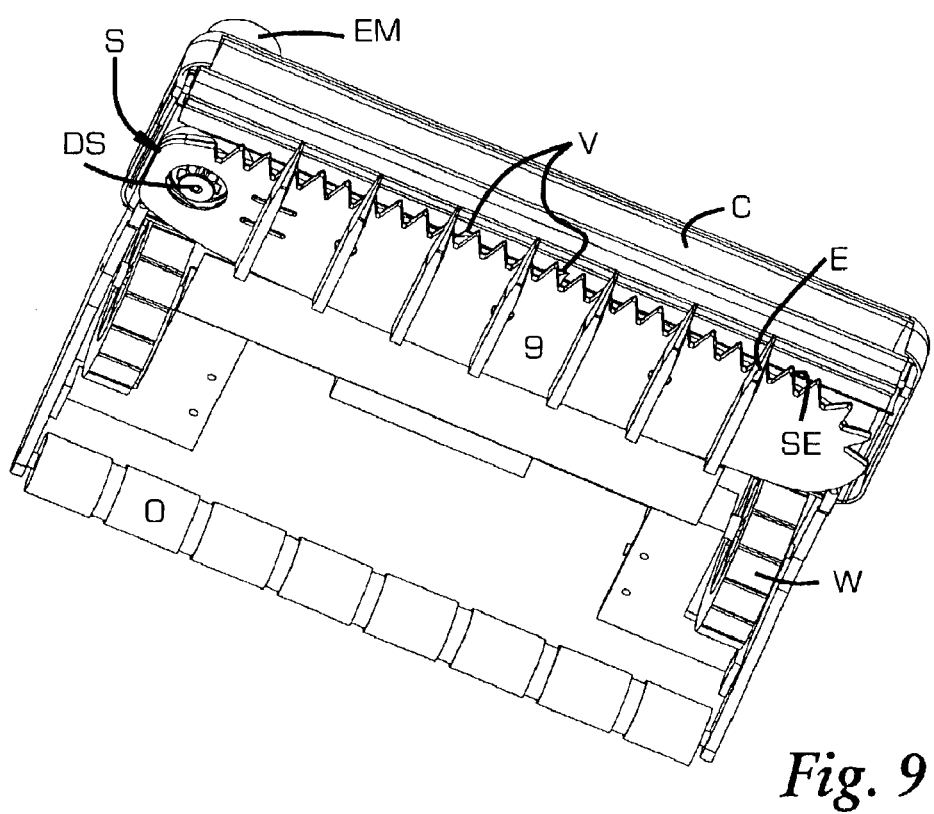
FIG. 9 shows an anterior bottom oblique surface view of a low energy sickle mower according to the invention.

Now referring to FIG. 9, an anterior bottom oblique surface view of a low energy sickle mower according to the invention is shown. The figure shows selected components as viewed from the underside of the mower, with front cover C affixed to frame F, and the anterior portion of the mower generally at the top of the figure. It can been explicitly seen how frame F supports wheels W and rollers O, while motor EM, mostly obscured by the mower underside, is partly shown beyond front cover C on the left side of the figure. A portion of stator S is shown, namely lower stator 9, comprising a plurality of stator elements SE, and with affixed or integral optional ribs E clearly shown. Blade V is shown, passing across the upper side (not visible) of lower stator 9, and it is clear how it is possible for a grass blade to project upward and be caught between two adjacent stator elements SE and be subject to cutting by blade V. In the preferred embodiment, blade V is part of a blade set, described below, that is in the form of a chain of connected blades, capable of self-articulating and being driven internally around the periphery of stator S and lower stator 9 as portrayed. For this purpose, motor EM drives a driveshaft DS which in this embodiment is in mechanical communication with or affixed to a sprocket (not fully shown), which in turn drives the blade chain.

Figure 10:
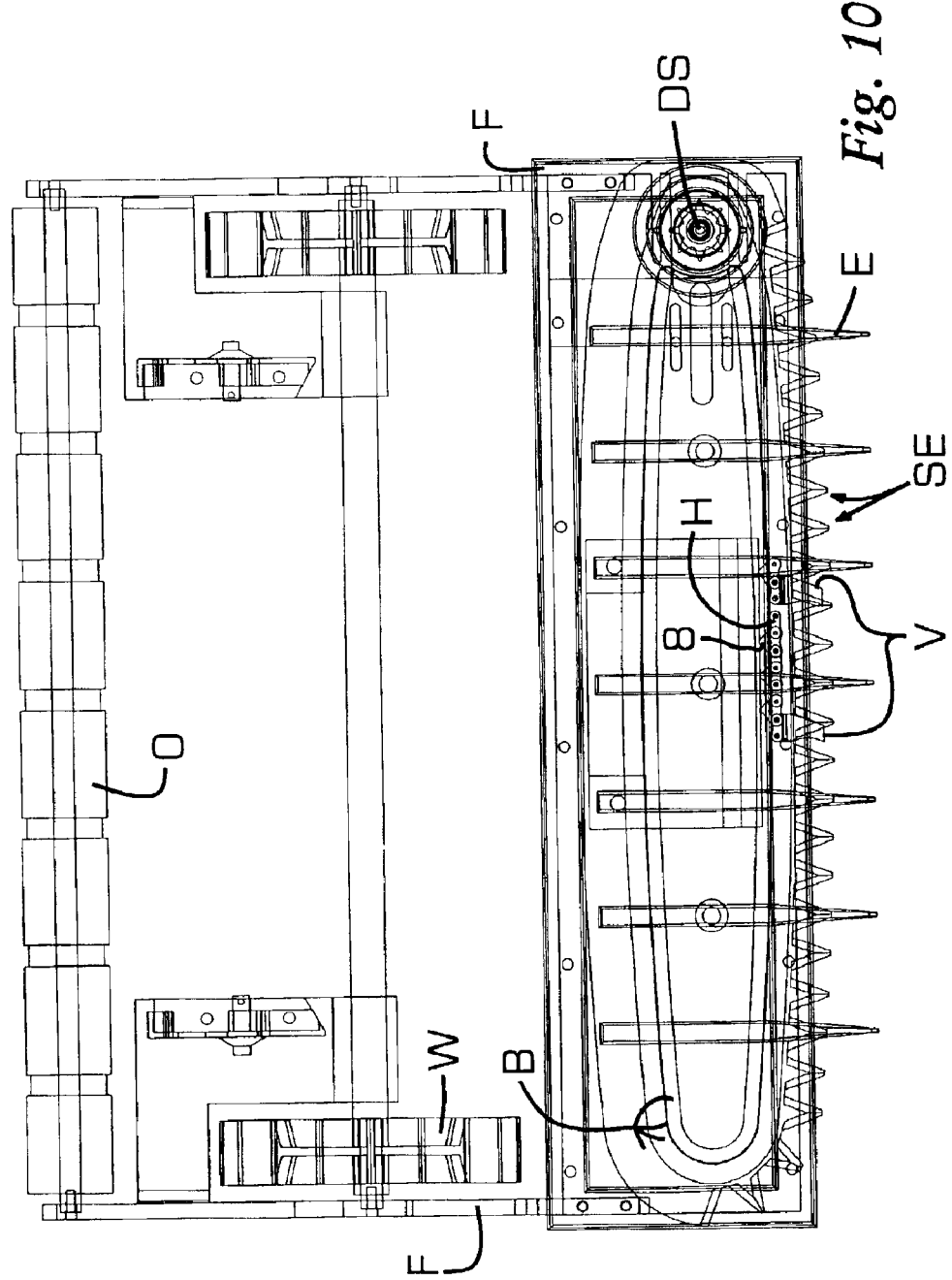
FIG. 10 shows a bottom combination surface and wireform view of selected components of a low energy sickle mower according to the invention, showing a bed for a moving blade set.

Now referring to FIG. 10, a bottom combination surface and wireform view of selected components of a low energy sickle mower according to the invention is shown, additionally showing a bed B for a moving blade set. This view is not oblique, and the anterior portion of the mower is shown at the bottom of the figure. Frame F is again shown supporting wheels W and rollers O, while selected components of the cutting deck D are shown in a "see through" wireform view. At the lower right side, driveshaft DS can be seen, with the outlines of motor EM circumferentially surrounding the driveshaft. Stator elements SE and optional ribs E are shown as before, and now a portion of a blade set is shown, with only two blades V shown for clarity. As will be further clarified below, this partial wireform view displays a portion of a blade set, showing two blades V, mutually linked as a chain form in a conventional manner by having the blades V affixed to a blade chain. The blade chain drivingly positions blades V and comprises a set of guide links 8 articulateably linked in an alternating manner to connecting links H, like a necklace formed from alternating beads of two different shapes. In this embodiment, the blades V are shown most closely associated with selected connecting links H, while the guide links 8 are used as guides, but the actual arrangement can vary, and common arrangements are known by those skilled in the art of blade chains, such as chain saw blades and the like. The blade set, including blades V, connecting links H, and guide links 8, moves in an endless manner in a bed established in the cutting deck D, with the trajectory as shown in bed B resembling an elongate oval track. In a manner known in the art, the blade chain is driven by a drive sprocket (not explicitly shown) affixed to driveshaft DS at the right side of the figure, and is supported and tensioned by a corresponding idler sprocket (not shown) at the left side of the figure and lateral opposite end of the oval track shape of bed B. The distance between the drive sprocket and the idler sprocket customarily determines the width of the swath cut for the mower, and for a given equal spacing of blades V, is a function of the number of identical blades that are interposed between the two sprockets. A typical lateral blade speed might be 7.5 miles/hour (12 km/hr) for a mower forward walking speed of 2.5 miles/hour (4 km/hr). As the blades V pass in front of the mower at the anterior portion of cutting deck D where stator elements SE are situated, shear cutting occurs on the cutting field when grass protrudes through the spaces between adjacent stator elements. Cleaning operations for the blade can be arranged using known methods within some portion of bed B, such as using a squeegee, wiper, blade or aperture to clean excess debris off blades V.

Figure 11:
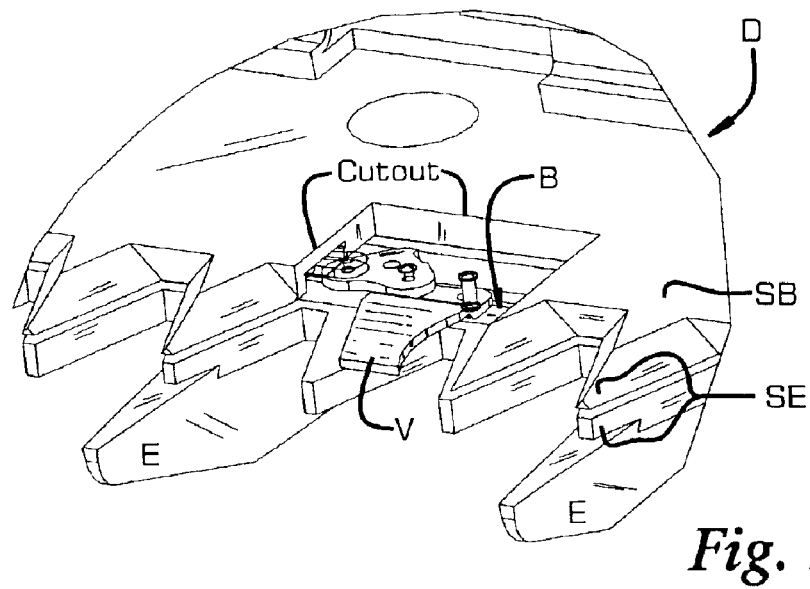
FIGS. 11 and 12 show close-up anterior oblique surface views of a cutting deck for a low energy sickle mower according to the invention, with a cut-out showing cutting blade structure and a portion of a blade set.
Figure 12:
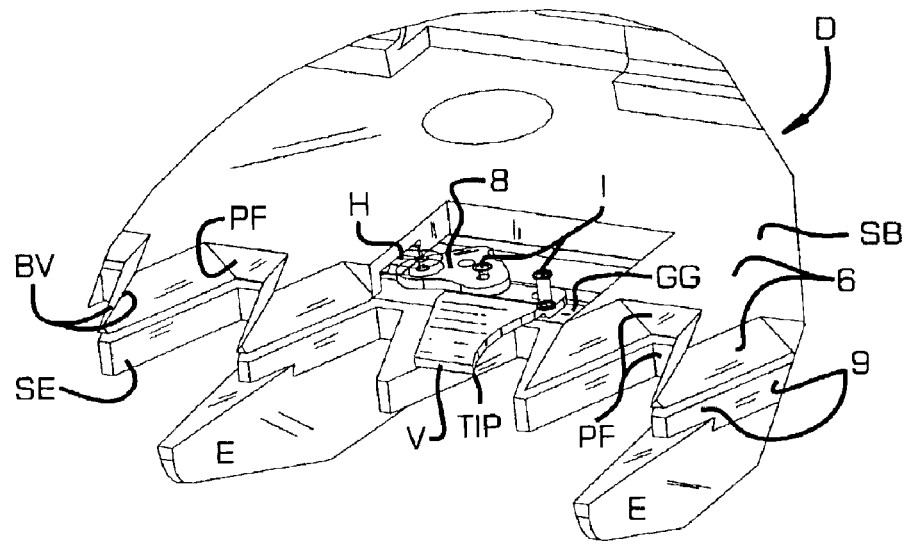

Now referring to FIGS. 11 and 12, close-up anterior oblique surface views of a portion of a cutting deck for a low energy sickle mower according to the invention are shown, with a cut-out showing cutting blade structure and a portion of a blade set. Cutting deck D is shown, comprising generally a stator (shown earlier, S) which in turn comprises generally stator elements SE which are integral with (or could be affixed to, if desired) the remainder of the stator, stator base SB, as shown. Specifically, as shown in FIG. 12, cutting deck D comprises upper stator 6 and lower stator 9. Upper stator 6 individually comprises stator elements SE and stator base SB, and lower stator 9 also individually comprises stator elements SE and a stator base SB (not visible). The stator base SB of upper stator 6 is shown with a cutout (shown, Cutout) which allows viewing an illustrative blade V and its supporting blade chain inside the cutting deck D between upper stator 6 and lower stator 9. The blade V is shown ready to move laterally to the right, guidingly supported between upper stator 6 and lower stator 9. Blade V is flat as shown, so as to pass very close to upper stator 6 and lower stator 9, and, as described further below, is not sharpened, but rather has flat faces which impinge upon grass entering the spaces between stator elements SE of both upper stator 6 and lower stator 9. At the forward end of blade V in its motion to the right on the page is a blade tip TIP. Blade V is shown connected on its left side to a guide link 8 (one is shown illustratively) and it can be readily seen that the guide link 8 is articulateably linked to blade V using a guide link pin I, which passes through an aperture or the mechanical equivalent (not visible) on the left side portion of blade V. For illustrative purposes, a second guide link pin I is shown on the right side of blade V, but for clarity, the corresponding connecting link H that would span these two guide link pins I is not shown. Shown, however, is a wireform connecting link H on the left side of guide link 8, which links to another guide link 8 leftward of that shown, but not visible for clarity. This blade chain established in a known way by linking blades V, guide links 8 and connecting links H rides inside a channel or guide groove GG of the bed B, which can, but does not necessarily have to, aligningly support blades V and which can be formed from interior portions of upper stator 6 or lower stator 9, or comprise additional elements such as high molecular weight liners.

It can be seen that there is a bevel form or bevel BV (left side, FIG. 12) that is part of the stator elements SE of upper stator 6. This is optional, but it has been discovered that beveling this element—in effect, streamlining the stator elements SE of upper stator 6 to have masses of grass approach the cutting deck D with minimum disturbance prior to cutting—increases cutting performance. See FIG. 29 and associated discussion below.

Also shown is a plurality of posterior flats PF found at the posterior edges or flats between adjacent stator elements SE. If incoming grass is not cut beforehand by action of blade V, it can hit this flat and be stabilized briefly before shear cutting.

Figure 13:
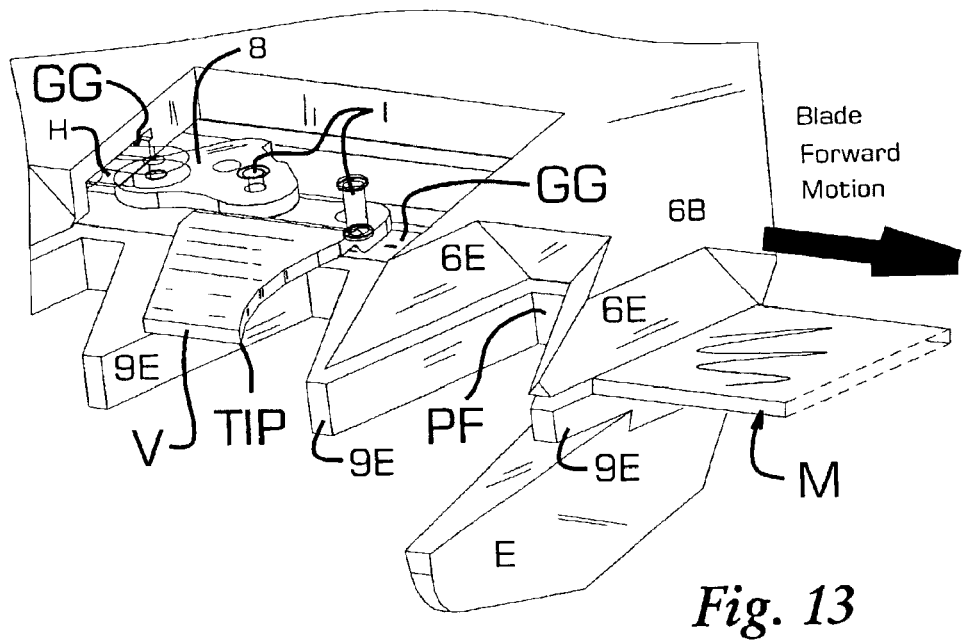
FIG. 13 shows a close-up of a portion of the anterior oblique surface views of FIGS. 11 and 12, additionally showing blade motion and cutting zone geometries.

Now referring to FIG. 13, a close-up of a portion of the anterior oblique surface views of FIGS. 11 and 12 is shown for clarity, and additionally shows blade motion and cutting zone geometries. For a specific description of this embodiment which employs a stator comprising an upper stator 6 and a lower stator 9 as separate parts, more specific nomenclature is now shown to differentiate the two stator components: stator elements SE of upper stator 6 and of lower stator 9 are now shown as upper stator elements 6E and lower stator elements 9E, respectively. Similarly, stator base SB of upper stator 6 as shown is now labeled as upper stator base 6B. Guide link 8 for blade V is shown as before, with connecting link H again shown in wireform, allowing blade V to ride through guide groove GG, established in this embodiment inside upper stator base 6B, as shown.

As blade V passes to the right in FIG. 13, it is guidingly supported through upper stator elements 6E and lower stator elements 9E, which each are so formed, shaped, manufactured or finished such that there is a well defined space or volume between them. The inside mutually facing surfaces of upper stator elements 6E and lower stator elements 9E form two planes, and bounding these infinite planes by the extent of the active cutting region results in a volume shown as cutting zone M. Cutting zone M is portrayed here as a hypothetical rectangular solid whose width or extent is defined by the depth or active portion of the blade V, from blade tip TIP to any root or blade base (not explicitly labeled for clarity), and by the thickness or distance between the two stator plates, which is the smallest dimension of the cutting zone M shown. The upper stator elements 6E and lower stator elements 9E surrounding cutting zone M are not shown, for clarity. Where grass protrudes between stator elements SE (specifically 6E and 9E here) and crosses the cutting zone M, it is subject to shear failure when the mower is operated according to the invention. The thickness of cutting zone M is known by the designer and is slightly and controllably larger than the thickness of the cutting blade (the thickness of the blade being its smallest dimension, somewhat along a vertical line in this oblique figure). This allows the blade to pass through upper stator elements 6E and lower stator elements 9E without mechanical interference and also allows performing the controlled gap thin blade shear process taught here.

This controlled gap thin blade shear process, enabled by the manner of support of the blade set comprising blades V, and by the geometry of the stator components surrounding them, is not taught in the prior art.

For example, U.S. Pat. No. 5,875,624 to Olinger does not teach using a controlled gap thin blade shear process using a dull blade. Instead, Olinger teaches use of a conventional sharpened blade set ("A series of traveling cutting blades is attached to the drive chain, each traveling blade having a sharpened surface extending along its leading edge." (2:49) Each blade comprises uses a "positive cutting action" (2:67), not a shearing action using a dull blade. Olinger's '624 blade set is supported in the area of its constituent rollers and blade chain by a high molecular weight liner, which "fully encases the (blade) chain" (2:39) and is meant to discourage vertical excursions of the blade and to maintain cleanliness (Col. 2). Olinger's blades are not guidingly supported in the area of the equivalent of blade body VB, as the liner of Olinger '624 is used only to wipe the blade clean of debris that accumulates. The cutting process is different and relies critically on a sharp blade. The gap between the cutting blades is not controlled specifically and there is no teaching of use of a dull blade with a controlled gap or controlled total gap using two sets of stator elements, as taught here.

Figure 14:
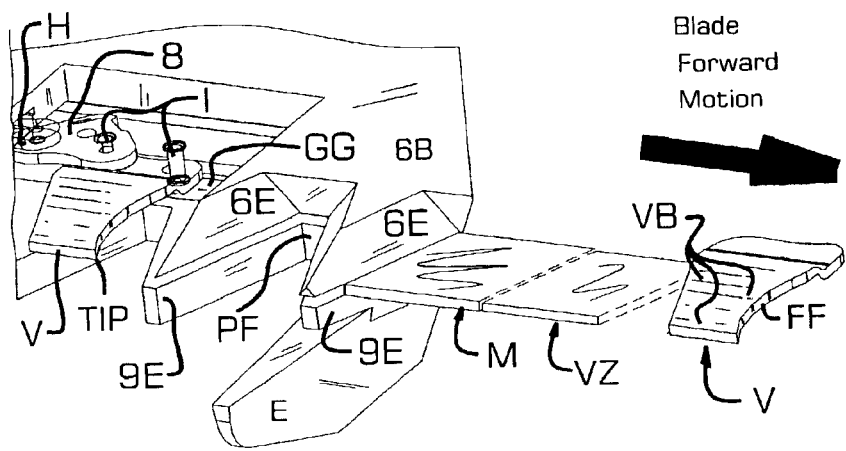
FIG. 14 shows the anterior oblique surface view of FIGS. 11 and 12, additionally showing a blade zone geometry created by a second forward disposed blade in motion.

Now referring to FIG. 14, the anterior oblique surface view of FIGS. 11 and 12 is shown, additionally showing a blade zone geometry created by a second forwardly disposed blade shown hypothetically in motion. As the blade V moves to the right, it eventually will pass through the cutting zone M portrayed, and the thickness and depth of the blade V (see reference character $D_v$ in FIG. 24 below) will geometrically establish a generally planar blade zone VZ as shown. Again, upper stator elements 6E and lower stator elements 9E are removed from the vicinity, for clarity. The blade zone VZ is also a rectangular solid, developed geometrically by a front face FF of blade V as shown, as it moves across the stator.

Since the blade body VB as shown of blade V is less thick than the space between the upper stator elements 6E and lower stator elements 9E, blade zone VZ is correspondingly thinner as well. The difference between the thickness of cutting zone M and blade zone VZ will be termed total controlled gap in the discussion below. The maintenance of the total controlled gap is important, and to serve this end, upper stator elements 6E, lower stator elements 9E, and possibly upper stator base 6B and lower stator base 9B as well, are instrumental in guiding blade V in a controlled manner which allows the necessary dimensional control.

Figure 15:
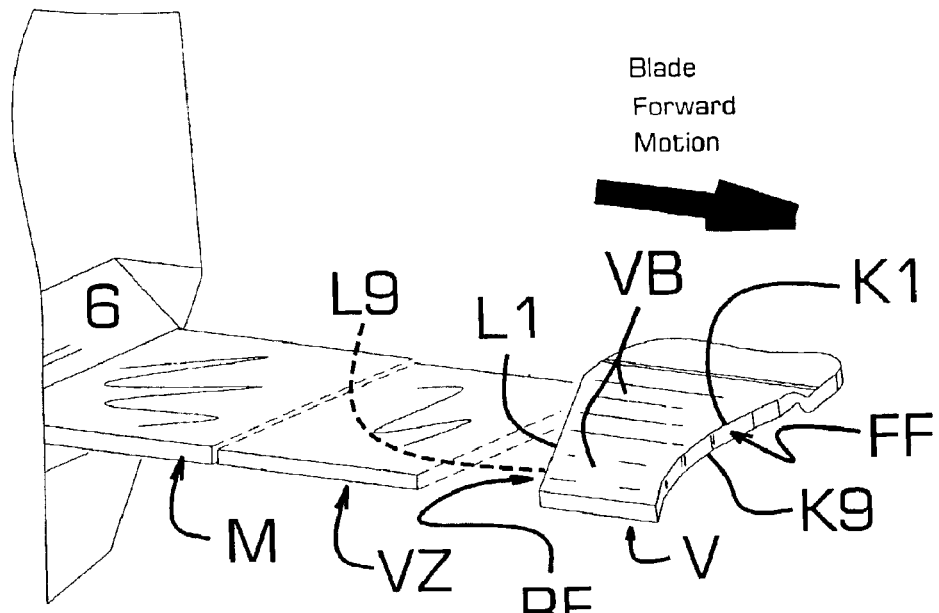
FIG. 15 shows a closeup of a portion of the structure shown in FIG. 14, showing blade motion, cutting and blade zone geometries and leading and trailing edges of a blade.

Now referring to FIG. 15, a closeup of a portion of the structure shown in FIG. 14 is given, showing blade motion, the cutting and blade zone geometries just introduced, and leading and trailing edges of the blade V. Cutting zone M is shown along with blade zone VZ, where it can be expected that blade V will pass and operate. Blade V is shown, again having moved hypothetically or in reality to the right as shown.

It bears repeating that blade V as shown is essentially unsharpened or dull, aside from being flat or somewhat flat. Blade V comprises blade front face FF and blade reverse face RF as shown. The blade shown is merely illustrative, and many variants are possible without departing from the invention, and also the blade is not entirely to scale (mostly because it is thinner in reality), but the essential characters of front face FF and a reverse face RF have not been masked or changed—they are essentially flat or dull, not ground to a sharp point or central cutting line (see Dull in Definitions section).

The root of blade V is shown (not labeled for clarity) and lacks hatching; it is where apertures or other mechanical affixation occurs for the purpose of moving the blade through the stator. Front face FF comprises upper leading edge K1 and lower leading edge K9 as shown, and reverse face RF comprises upper trailing edge L1 and lower trailing edge L9 as shown. The leading edges K1 and K9 will create two sites for shearing action, as described below. Between upper leading edge K1 and lower leading edge K9 on the leading side, and upper trailing edge L1 and lower trailing edge L9 on the trailing side, there is blade body VB as shown. However, blade body VB can take many forms and does not have to be a solid body as shown; it can possess apertures, slots, or have structure, such as wire bodies or other forms. The blade can also take the form of an open structure, where most of what is portrayed as blade body VB is mostly absent, with simply a front face FF and a reverse face RF connected by side walls or some structure. In front face FF, it is the upper leading edge K1 and lower leading edge K9 that are vital in this embodiment to develop the blade zone VZ and to enable the controlled gap thin blade shear process of the invention. However, it is entirely possible to practice the invention with added functionality, such as a conventional knife cut function added, such as obtained by having a blade V that has an upper leading edge K1 and lower leading edge K9 on a blade front face FF which also comprises a sharp edge or knife edge situated between the upper leading edge K1 and lower leading edge K9. This will be reflected in the appended claims.

Figure 16:
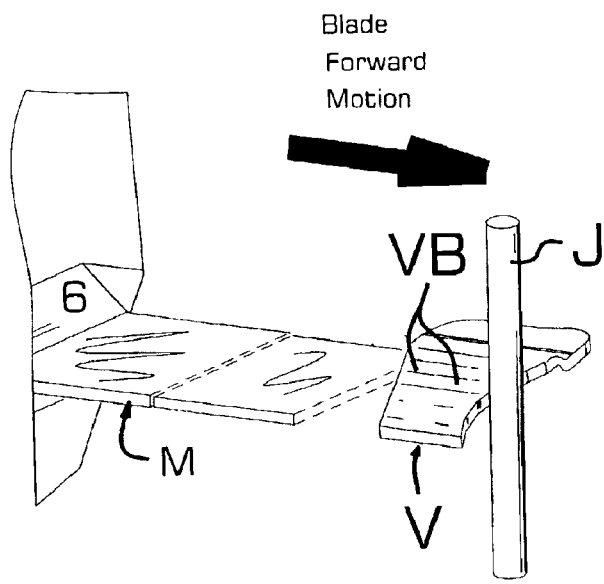
FIG. 16 shows a portion of the geometries of FIG. 15, with the blade impinging upon an obstruction.

Referring now to FIG. 16, a portion of the geometries of FIG. 15 is shown, with the blade impinging upon an obstruction. Blade V is shown, comprising blade body VB and moving in a forward direction, to the right in the figure, and contacting an illustrative obstruction J as shown, such as when a blade undergoing forward motion in a low energy sickle mower according to the invention impacts upon a stick, large plant stalk, or a human finger.

Figure 17:
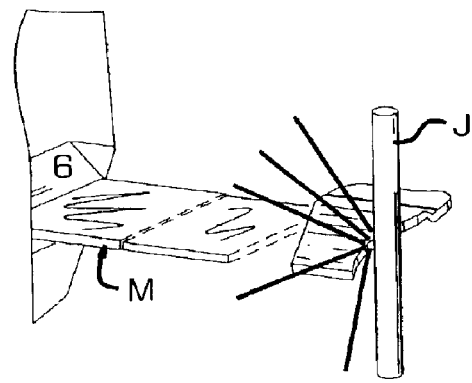
FIG. 17 shows the view of FIG. 16, with the blade impinging upon an obstruction in a manner discouraged by the teachings of the invention.

Now referring to FIG. 17, a view similar to that of FIG. 16 is shown, with the blade impinging upon obstruction J in a manner discouraged by the teachings of the invention—that is, impacting the obstruction with no reversing (see "Definitions" for reversing) and with great force. This violates at least one premise of the goals to be achieved by the invention, namely, elimination of the requirement to have a high reserve torque motor or process driving the blades. Furthermore, such blade impacts, under the tremendous transient forces generated to bring the blade to a halt, including overcoming the total rotational inertia of the motor, drivetrain and blade set, can cause damage to the front face FF of blade V.

Figure 18:
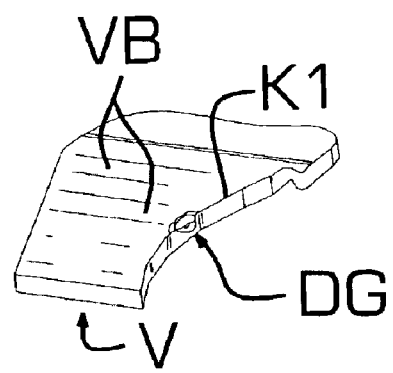
FIG. 18 shows an oblique surface view of a blade having suffered a blade ding during the motion described in FIG. 17.

FIG. 17 shows graphically such a catastrophic impact, and now referring to FIG. 18, an oblique surface view of a blade having suffered a blade ding during this motion is shown, where blade body VB remains intact, but upper leading edge K1 of front face FF of blade V has been deformed or damaged, resulting in a blade ding DG as shown. The damage shown is merely illustrative, showing a typical deformation or nick of upper leading edge K1, causing it to no longer be flat enough or of a low enough profile to pass through the cutting zone M without mechanical interference or scoring, and/or causing the shape of the blade zone VZ to change. With the controlled total gap as taught here, this ding can result in the blade V mechanically interfering with or getting caught by upper stator elements 6E or lower stator element 9E as it attempts to proceed further forward, as the blade ding DG changes the effective thickness of the blade V and violates the metes and bounds of an acceptable blade zone VZ as shown earlier.

Figure 19:
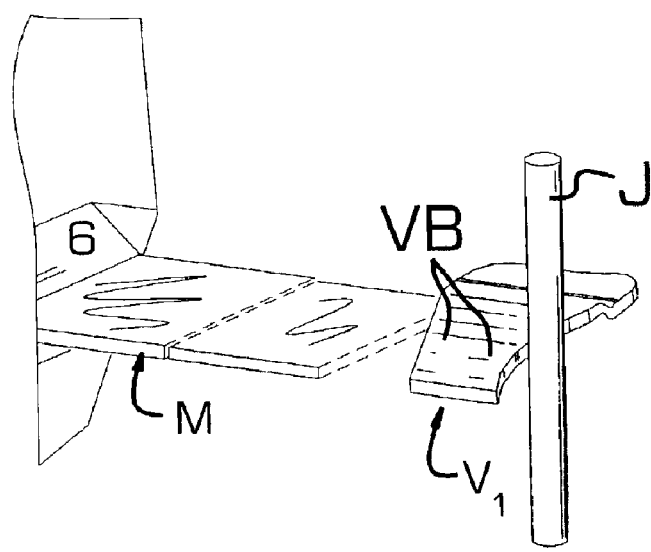
FIGS. 19 and 20 show a blade as given in FIG. 16, impinging upon an obstruction in a manner encouraged by the teachings of the invention, and later clearing the obstruction using reverse motion.
Figure 20:
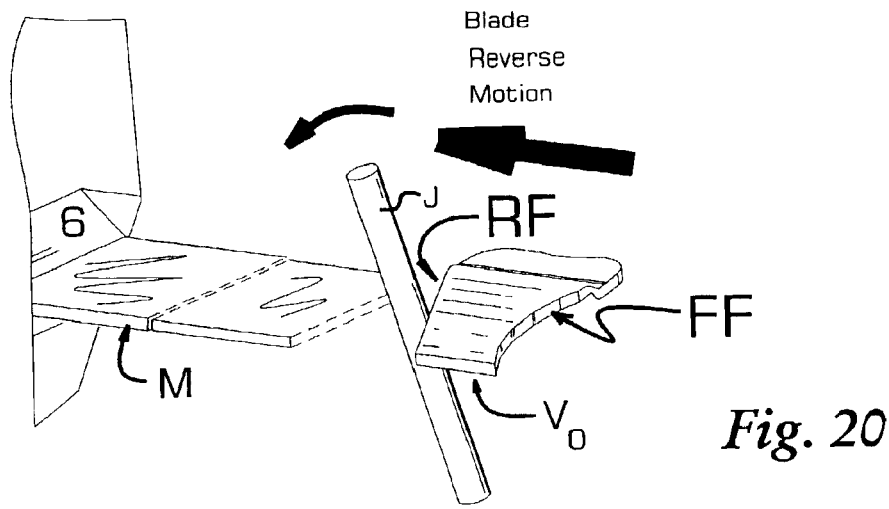

Now referring to FIGS. 19 and 20, a blade V is shown as in FIG. 16, but now impinging upon obstruction J in a manner encouraged by the teachings of the invention. In FIG. 19, blade V, now labeled as blade $V_1$, impacts upon obstruction J with only moderate force. A good rule of thumb here is that during manufacturer's testing, a standard No. 2 pencil interposed as a test obstruction J should not be broken. This test assures that severing damage to any human finger accidentally interposed between any stator elements SE should not occur. A torque management and control system, described below, senses either operating forces, operating torques, or related quantities like motor current draw, to gauge how much current to deliver to the motor EM, and backs off (reversing) when an obstruction is encountered, as detected when operating torque or required current levels needed to maintain blade speed go up too quickly. The torque management and control system then takes remedial reversing action, either a lowering of motor current or an actual reversal in motor current. This is known as a Backout, where a reversing of blade V allows a passive rejection or freeing of obstruction J. Actual motion of blade V involved in a backout can be minimal, comprising as little as a simple relief of blade apply pressure to allow the obstruction to free itself during mower forward motion.

If this Backout procedure fails to clear the obstruction, it can be repeated, often to good effect. Alternatively, a Kickout procedure can be ordered by the torque management system, where the obstruction J is cleared using substantial reverse motion applied to the blade set or blade $V_1$.

Now referring to FIG. 20, a Kickout is shown whereby a second blade $V_0$ positioned forward of first blade (e.g., having already passed the same location in the stator(s)) undergoes wholesale reverse motion to the point of contacting the obstruction J encountered originally by blade $V_1$, whereby the obstruction is impacted by reverse face RF of blade $V_0$, and moved in a reverse direction in an attempt to kick out the obstruction by the same general path it installed itself, as can been seen illustrated here with obstruction J tilting out of the influence of cutting zone M. This is usually quite effective, and saves the operator from having to stop the mowing process and manually clear the obstruction. By not endeavoring to destroy the obstruction by force, much energy is saved during mower operation.

Complex or creative strategies can be used by the motor control system for obstruction backout and kickout, and also for blade cleaning (see FIGS. 52–53 below). A jitter, or wholesale back and forth motion can also be superimposed to help with obstruction clearing or blade cleaning. For example, jitter can be applied to blade V to free a recalcitrant piece of copper wire picked up by one or more stator elements SE from the cutting field, or to clean off resinous substances or secondary cutting products that have accumulated on blade and stator elements. Preferably, reverse face RF of blades V should also be blunt or dull, so as not to entrain itself in an obstruction that it is trying to clear during a backout or kickout procedure.

Figure 21:
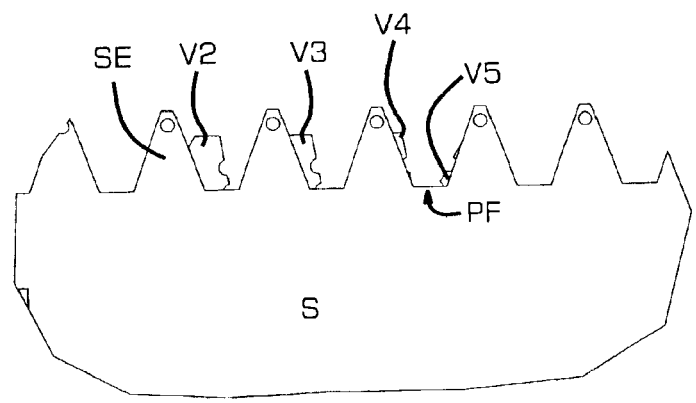
FIG. 21 shows a top-down cross-sectional view of a hypothetical stator and blade set, showing staggered blade positioning.

Now referring to FIG. 21, a top-down cross-sectional view of a hypothetical stator and blade set is shown, showing staggered blade positioning for what is commonly called load leveling or load phase shifting. Stator S is shown, comprising a plurality of posterior flats PF defined between a set of equally spaced stator elements SE as shown, and with blades V2, V3, V4, and V5 are shown passing by the stator elements SE. Blades V2–V5 are staggered as shown, positioned out of phase in their positions relative to the stator elements SE, so as to insure that maximums in the load values or load cycle for each blade do not coincide with one another, but rather are spread out in time, so as to even out or smooth the motor load for motor EM. It can be appreciated that one of ordinary skill in the mechanical arts can use variants on this concept, for example, keeping the spacing of blades V2–V5 constant, and instead staggering or phase shifting the lateral or relative spacing of stator elements SE (this variant not shown). This can be desirable since it is practical for each blade V and its associated hardware set (e.g., guide link 8 and connecting link H) to be identical to those of the next blade. A most elegant to achieve phase shifting it to take the approximate desired blade population (such as a ⅓ blade population density, i.e., one cutting blade per 3 stator elements on the cutting deck D), and to subtract one blade. This "subtract one" technique can allow an easy way to insure that the phases of each blade are mutually different and that the relative spacing of adjacent stator elements and adjacent cutting blades are not multiples of one another, i.e., not ½, ⅓, ⅖, etc. The general idea is to spread out the peaks on the blade load cycles—such a peak might occur, for example, as the cutting blade has pushed all grass blades under it influence toward the forward lying stator element, and is about to shear them or bring them to shear failure. Ideally, one arranges the stator element lateral spacing and/or the cutting blade lateral spacing so that one achieves or approaches a situation in which the number of teeth that are actually shear cutting at any particular time is relatively constant. Other techniques for load phase shifting can be used as well, and all such techniques allow for mower operation using lower torque and energy requirements.

Figure 22:
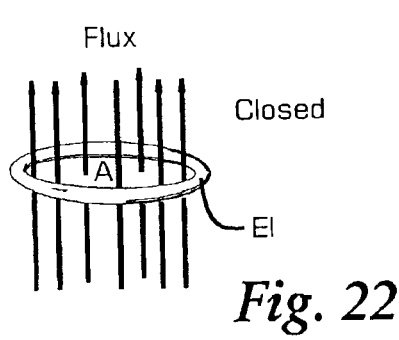
FIGS. 22 and 23 illustrate basic concepts for open and closed flux traps as used herein.
Figure 23:
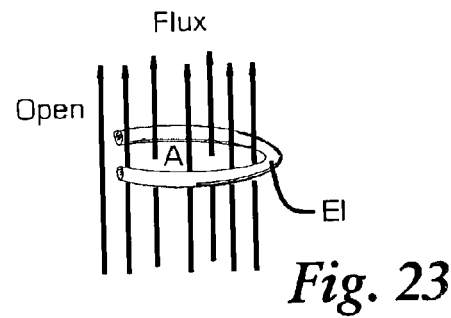

Now referring to FIGS. 22 and 23 basic concepts for open and closed flux traps as used herein are illustrated. In this disclosure, flux is used as defined here (Definitions) to denote flow of grass blades or grass mass crossing a two-dimensional area, generally, but not necessarily a planar area. Similarly, flux traps shall refer to these areas where severing, damaging or shear failure of grass is expected to occur using the low energy sickle mower of this invention. In FIGS. 22 and 23, closed and open flux traps formed by ellipses El are shown, respectively, defining an area A and allowing passage of flux (Flux) as shown.

Figure 24:
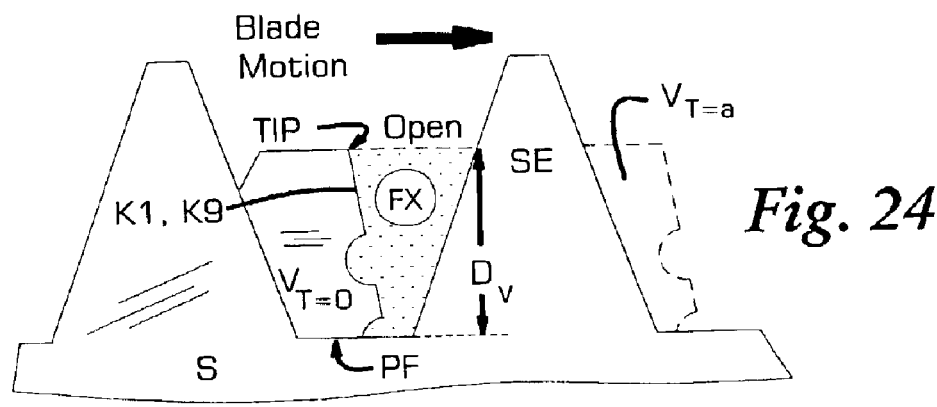
FIGS. 24–26 show top-down cross-sectional views of three different blade/stator geometries that create open and closed flux traps.
Figure 25:
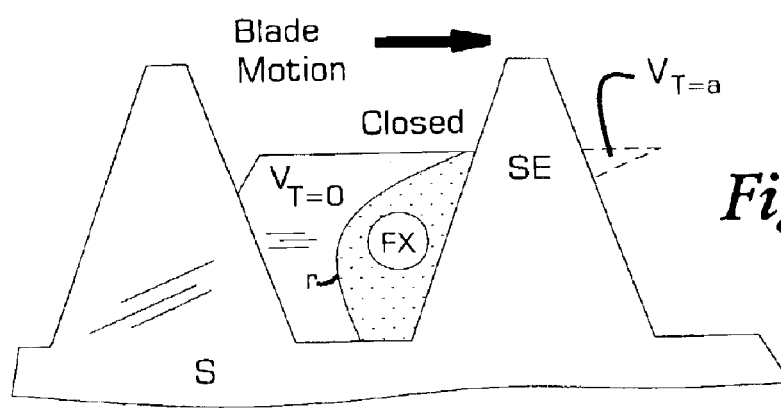
Figure 26:
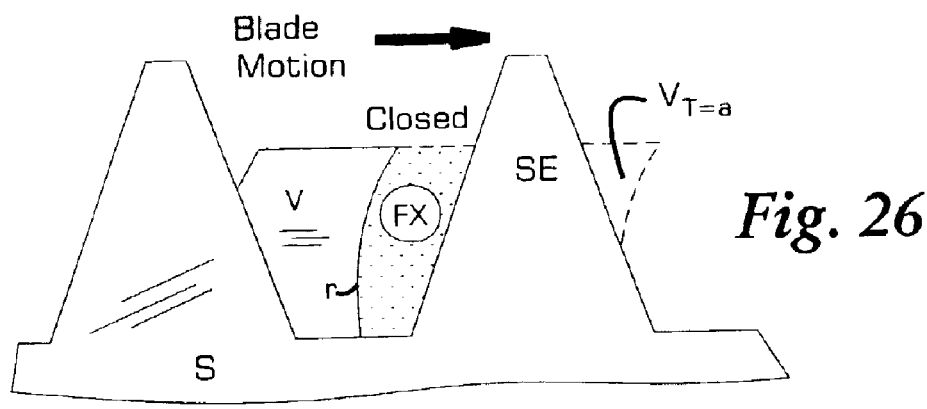

Now referring to FIGS. 24–26, top-down cross-sectional views of three different blade/stator geometries that create open and closed flux traps are shown. In each of these three figures, a blade V at time=zero ($V_{T=0}$) is shown crossing a stator with associated stator elements SE, in motion to the right on the figure, as shown. A flux of grass is shown as FX, portrayed with dots to represent illustratively upwardly oriented tips of grass. A flux trap is formed by the area shown by flux FX; this area is subtended by lines formed by the following: the inboard or posterior flat PF between stator elements; the two mutually-facing inside edges of a pair of stator elements SE; and the line established on or near the outboard or anterior (forward end) of the stator by the cutting blade tip (TIP) during its forward motion. To illustrate a sequence of events, a silhouette of the blade V is shown using a dashed line to represent the position of the blade for time=a ($V_{T=a}$) whereby presumably each of these blades in the three figures has crossed the flux traps shown. FIG. 24 shows an open flux trap blade design where the flux trap is so formed and shaped such that the blade tip TIP arrives at a stator element SE after the rest of, or another portion of the blade front face or midsection, as shown. FIG. 25 shows a closed flux trap blade design where the blade tip TIP is far forward of the remainder of the blade midsection or front face, and FIG. 26 shows a closed flux trap blade design where the blade tip TIP is moderately forward of the blade midsection. As will be disclosed below, it has been discovered that FIG. 25 as illustrated is not preferred, as a gentle C-shape for the blade profiles (profiles as shown in this figure) is preferred and leads to unexpectedly reduced accumulation of secondary cutting products on the blade. Also, motion of blades V should be sufficient to cover any and all flux traps that might be created over a cutting field. There should be enough blades, given the stator element population, and enough blade motion to create sufficient blade swipes, to cut all grass by crossing all flux traps that could be created as blade stator-profiles that define the flux traps move across the grass.

Figure 27:
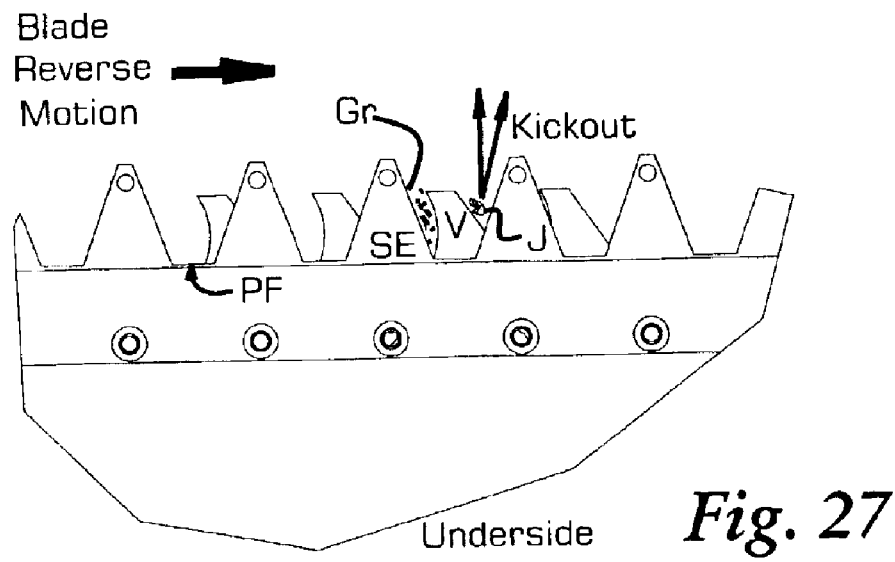
FIG. 27 shows a top-down cross-sectional view of a hypothetical blade and stator set, kicking out an obstruction using reverse motion according to the invention.

Now referring to FIG. 27, a top-down cross-sectional view of a hypothetical blade and stator set is shown kicking out an obstruction using reverse motion according to the invention. This view is from the mower deck underside, and it portrays a kickout similar to that of FIG. 20, with the blade reverse motion now shown to the right. As blade V undergoes reverse motion to kick out obstruction 3 as shown, there can be repeated attempts required for a successful kickout. During this time, the mower operator is presumed to have continued walking in a forward motion of approximately 2.5 miles/hour (4 km/hr), and there is the continued burden or overhead of having to continue to cut grass during that time. If the kickout occurs immediately on the first try, there is sufficient blade numerical redundancy to allow that grass will remain in the flux trap created by the blades and stator and be cut by a moving cutting blade before it slips out therefrom. However, for repeated attempts at a kickout, this may not be the case, and it then would be useful to cut some grass in between kickout attempts. In this figure, it is illustrated that it is possible to attempt kickouts of obstruction J using a reverse face of blade V, and during blade forward motion between attempts (leftward in the figure), shear cut grass Gr at a front face as shown. The blade can thus reciprocate for a short time in continuing to attempt a kickout, and cut grass so as to not fall behind on the cutting load. As can be seen the actual back-and-forth blade lateral motion needed is small, typically 3–6 cm; this allows that the reciprocation frequency can be relatively high, e.g., 40–100 Hz. As described below, a user interface can always signal the operator to slow down somewhat if that is necessary for proper grass cutting.

Furthermore, if desired, the blade V can be driven for some time in a reverse direction, both to clear any obstructions and/or secondary cutting products that have accumulated on the blades and/or stators, and to cut grass, generally. Cutting grass using reverse motion would be similar to that described here, with the trailing edges (upper trailing edge L1 and lower trailing edge L9) forming a blade zone VZ, with cutting done in a fashion similar to that done with forward blade motion. In fact, a low energy sickle mower operating according to the invention can use forward and reverse blade motion equally if desired. The remainder of the specification and claims should be interpreted accordingly.

Figure 28:
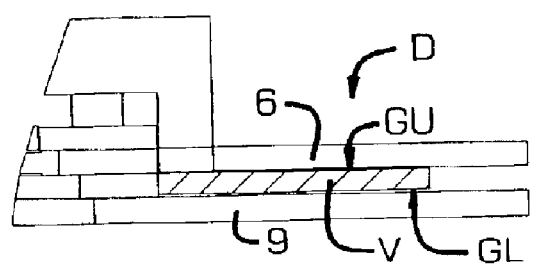
FIG. 28 shows a non-beveled upper and lower stator and moving blade in a side cross-section.

Now referring to FIG. 28, a cutting deck D comprising a non-beveled upper and lower stator supporting a moving blade is shown in a side cross-section. Upper stator 6 and lower stator 9 are shown guidingly supporting blade V, with stator elements SE omitted for clarity. In this view, grass (not shown) is vertical and would be sheared with the blade V moving in or out of the page. The blade chain structure (e.g., guide links 8 and connecting links H) described above is propelled by a drive sprocket in conjunction with an idler sprocket, and no other support means for the blade chain is provided (in contrast to prior art teachings, e.g., U.S. Pat. No. 5,875,624 to Olinger). The blade V, therefore, is entirely guidingly supported by upper stator 6 and lower stator 9 (and usually it is upper stator elements 6E and lower stator elements 9E that do all or most of the supporting). This stator support allows for a controlled gap thin blade shear process, such that an upper gap GU and lower gap GL as shown are maintained. Upper gap GU and lower gap GL represent the average or effective gap or distance (along vertical lines if shown in the figure) between upper stator 6 and blade V, and between blade V and lower stator 9, respectively, as shown. Given some mechanical play needed for non-interference with upper stator 6 and lower stator 9, the blade V can move up and down slightly (in reality, and vertically in the figure), and this would cause upper gap GU and lower gap GL to change from moment to moment during blade motion. For this reason, it is advantageous to consider a Total Controlled Gap, a geometrically determined quantity that is not a function of vertical movements of the blade V, where the Total Controlled Gap Z is equal to the sum of the upper gap GU and lower gap GL:

$$Z = GU + GL \qquad \text{Eqn (1)}$$

and comparison with FIGS. 14–16 yields that this Total Controlled Gap Z is something of a geometric constant, being equal to the difference in thicknesses between the cutting zone M and blade zone VZ:

$$Z = (\text{Thickness of cutting zone } M) - (\text{Thickness of blade zone VZ}) \qquad (2)$$

It is preferred, as discussed below, that the Total Controlled Gap Z be between 1 mils (0.025 mm) and 8 mils (0.203 mm), and most preferably between 2 mils (0.051 mm) and 5 mils (0.127 mm). The implications of this Gap Z are far reaching, and determine the success of the cutting process, the cleanliness of the process, the required torque for motor EM, and what type of cutting occurs in the cutting zone. In any case, the Total Controlled Gap Z should be less than 40 mils (1 mm) when cutting turf grass.

Figure 29:
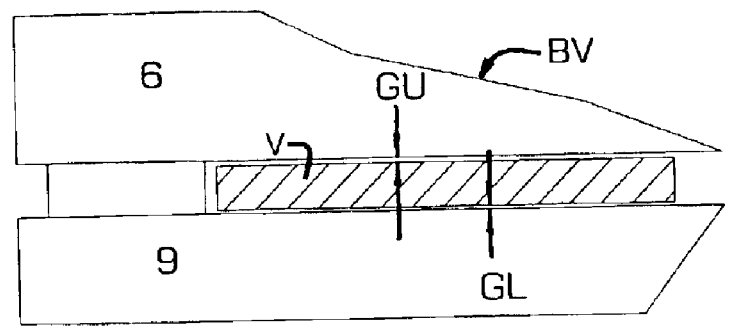
FIG. 29 shows a beveled upper and lower stator and moving blade in a side cross-section.

Now referring to FIG. 29, a beveled upper stator 6 and lower stator 9 and moving blade V are shown in a side cross-section similar to that of FIG. 28, except that now the stators are so formed as to comprise a bevel BV, as shown. Although lower stator 9 is shown beveled, it has been discovered that the bevel BV shown on the upper stator 6 results in improved cutting, as mentioned. It is believed, but has not been verified, that this results from less disturbance of the directionality of grass in the cutting field just prior to entrance into the cutting zone between stator elements SE.

Figure 30:
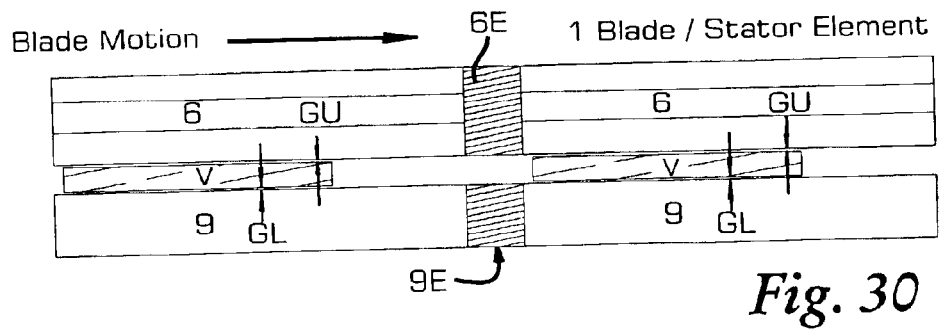
FIG. 30 shows a cross-section of a blade and upper and lower stator set as viewed from the front of a cutting deck.

Now referring to FIG. 30, a cross-section of a blade and upper and lower stator set as viewed in a vertical plane from the front of a cutting deck is shown. In this figure, a nominal blade/stator population of 1 (1 cutting blade per stator element) is shown, with an upper stator 6 comprising three layers of sheet metal or plastic sheets; a lower stator 9, as shown; two blades V as shown, in motion to the right, with upper gap GU and lower gap GL as shown. Upper stator element 6E and lower stator element 9E are as shown, and this being an end-on view of a particular vertically oriented plane from the front of the mower, these stator elements are shown with a mid-range thickness, heavily hatched. The vertical plane viewed in the figure is not one in which the stator elements might come to a point, so to speak; nor is it one near the stator base (upper stator base 6B or lower stator base 9B, not shown); it is rather a vertical plane that is forward of the first and back from the latter, and this and later figures are merely given to give a representative view of cutting events.

Figure 31:
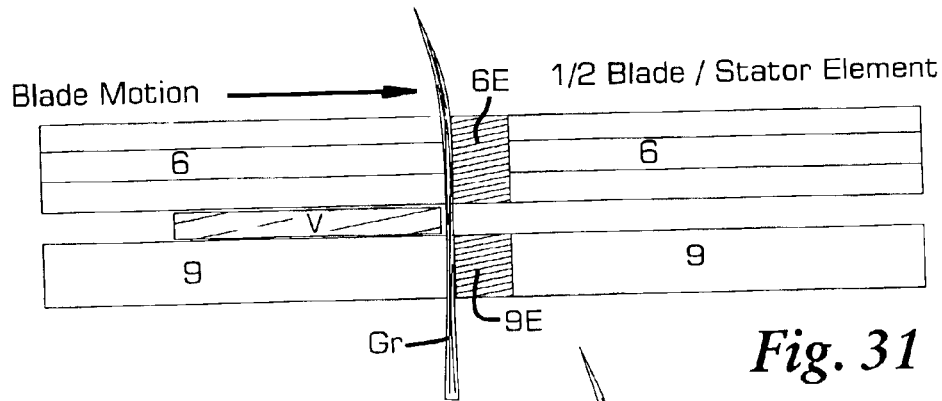
FIGS. 31 and 32 show frontal cross-sections similar to that of FIG. 30, showing a blade impinging upon a blade of grass just prior to shearing under blade forward motion.
Figure 32:
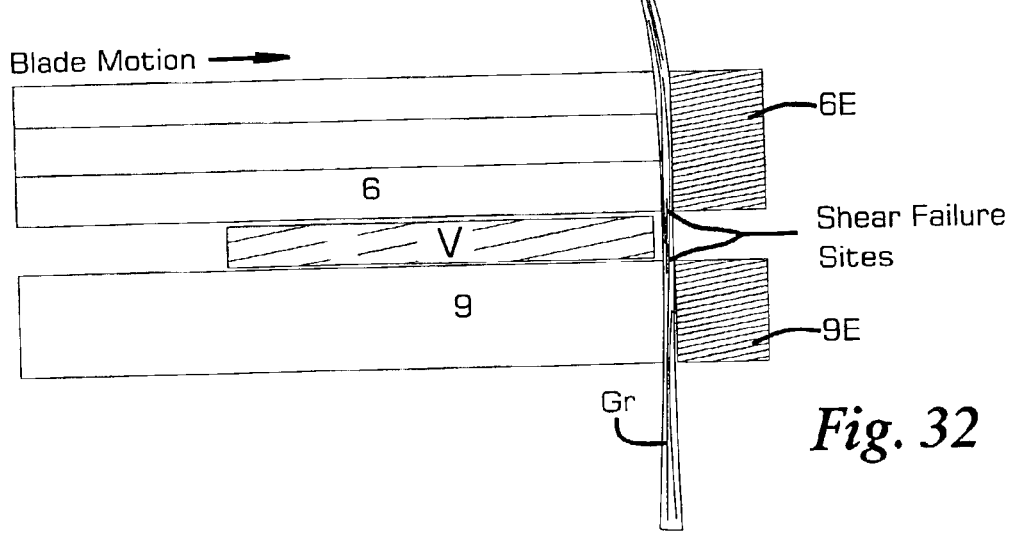

Now referring to FIGS. 31 and 32, frontal cross-sections similar to that of FIG. 30 are shown, portraying a blade impinging upon a blade of grass just prior to shearing under blade forward motion. Here, for illustration, a nominal blade/stator population of ½ or 50% is used (1 cutting blade per two stator elements), and a blade of grass Gr (hereinafter, grass) is shown essentially backed up against the upper stator element 6E and lower stator element 9E, as shown. Blade V is in forward motion to the right as shown, not yet having a bona fide impact upon grass Gr. FIG. 32 shows a close-up of the relevant left side portion of FIG. 31. Using the controlled gap thin blade shear process taught here, there will not be a knife cut or similar single-location cutting event; instead, it can be seen that with the prospect of blade V impinging upon grass Gr, passing shearingly by upper stator element 6E and lower stator element 9E under a Total Controlled Gap Z, there will two possible shear failure sites as shown, in the vicinity of the upper and lower gaps between blade V and the surrounding stator structures, caused by motion of the blade upper leading edge K1 and lower leading edge K9, respectively.

Now referring to FIG. 33, a close-up view of this is shown, where the two potential shear failure sites in the vicinity of upper gap GU and lower gap GL are labeled S6 and S9, respectively.

Now referring to FIG. 34, a close-up view of FIG. 33 is given at a later time just after actual shear failure of the grass Gr, using a small controlled total gap between stators and blade, as taught by the invention. As can be seen, a shear failure (SHEAR FAILURE) has occurred at shear failure site S6, immediately adjacent both upper stator element 6E and blade V. It is entirely possible that a similar shear failure would happen some milliseconds later at shear failure site S9, but the grass has now been cut, and cleanly, without ripping or tearing. The success or failure of a shear cut at site S9 is no longer material to overall cutting performance.

This twin shear failure site process provides that this controlled gap thin blade shear process using upper stator elements 6E and lower stator elements 9E allows cutting to occur at either an upper or lower leading edge of blade V, whichever fails first. This affords a significant statistical and dynamical advantage for cutting kinetics and overall cutting performance. It allows, in essence, for the shear failure to occur customarily at the weakest of two locations, thereby improving the speed and quality of the cutting process.

Blade thickness is also important, for even though this controlled gap thin blade shear process does not rely on knife cutting, a thin blade appears to improve performance by aiding the shear process, possibly by allowing more readily tiny deformations of grass blades Gr (deformations not explicitly shown) in the vicinity of the blade front face just prior to shear failure, and possibly by reducing the size of any shorn mid-pieces defined and created by the cutting blade thickness. The figures may not be to scale in this regard. Preferred thickness of blades V is between 0.020 and 0.060 inch, or 0.5 mm to 1.53 mm, although a thin blade can vary using this invention from 0.010 inch to 0.080 inch (0.25 mm–2.00 mm), or even as high as 0.100 inch (2.54 mm). Thinner blades can also be used, subject to strength limitations and blade lifetime considerations (e.g., resistance to shattering and wear), such as a blade thickness of 0.005 inch (0.13 mm). The dull blade used in this controlled gap thin blade shear process should be thin in relation to the typical section diameter of the grass to be cut, that is, it should be on the same order of magnitude or less. In this sense, while a 7 mm blade thickness would not be a thin blade for most types of grass, it would possibly be thin for certain vegetation, e.g., straw-like stalks and small brush. The blade thickness can be chosen appropriately. For turf grass applications, a blade thickness of 0.020 to 0.030 inch (0.5 mm to 0.76 mm) works well, and due to its low weight, can move quickly under electromotive force by motor EM. This allows easy reciprocation as mentioned above, and for easy changes in direction, such as when clearing an obstruction.

Now referring to FIG. 35, an illustration of what happens with a poorly executed non-controlled gap thin blade shear process is given. A close-up view of FIG. 33 is shown at a later time where there is a large and/or uncontrolled total gap between upper stator elements 6E and lower stator elements 9E and blade V. Although the figures are not entirely to scale, upper gap GU and lower gap GL have been shown larger for illustration.

As can be seen, a tensile failure (TENSILE FAILURE) has occurred at what should have been shear failure site S9. Grass Gr has been pushed by the front face of blade V into the cutting zone. There was extra work or energy expended to draw the grass Gr into that space, and the failure was a tensile failure, such as when one takes a blade of grass in hand and pulls it until it breaks. There is a corresponding large increase in required operating torque and power for this operating regime, as well as greatly increased accumulation of secondary cutting products such as resins on blade V.

This tensile failure takes more energy than a shear cut because there is additional work involved in performing a tensile cut, as there is a pulling or stretching force applied across a distance over which there is some stretching according to some general elastic modulus for the grass, until the grass fails or breaks. Fibers in the grass can increase greatly the required force needed for this failure and can increase further the stretching and energy expended. This is why tensile cut processes take more energy to perform for each cut grass blade. There is also damage, well-known to the agricultural arts and turfgrass care profession, to the grass itself, inviting influx of disease and parasites as cited earlier.

For this reason, reel mowers have historically been preferred for their ability to provide shear cutting for golf courses, fine lawns, gardens, and the like, where a maintenance workforce is available for reel mower operation and maintenance.

Although the advantages of having twin potential shear failure sites have been cited here, it is possible, though not necessarily preferable, to practice the invention using a single set of stator elements.

Now referring to FIG. 36, a view similar to that of FIG. 33 is shown, giving an alternate embodiment of the invention, wherein cutting occurs using a moving blade passing along a single set of lower stator elements 9E. In this embodiment, upper stator elements 6E are absent, and upper stator 6 is present only to guidingly support blade V, as shown. In this case, the process proceeds, and the Total Controlled Gap Z recommended by this teaching is about one half that given above for a twin failure site cut using upper stator elements 6E and lower stator elements 9E. For this embodiment, a shear failure (not shown) of grass Gr must occur in the vicinity of lower stator element 9E at shear failure site S9 as shown.

Figure 37:
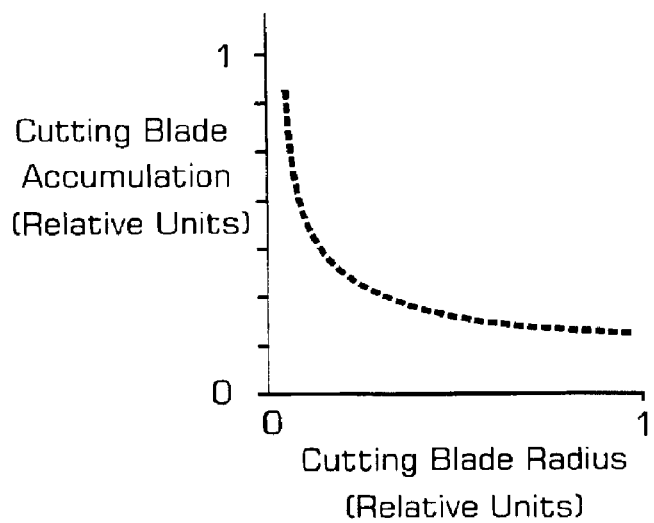
FIG. 37 shows a qualitative Cartesian plot of cutting blade accumulation versus blade radius.

Now referring to FIG. 37, a qualitative Cartesian plot of cutting blade accumulation versus blade radius is shown. It was mentioned above that gentle C shapes (see Definition) are preferred for the blade profiles such as illustrated in FIGS. 24–26, and 52–53. This Cartesian plot illustrates qualitatively the reduction with increasing blade profile radii of the accumulation of secondary cutting products on a cutting blade when used according to the invention, that is, using a controlled gap thin blade shear process. This includes secondary cutting products such as re-cut or mulched grass, or biological mass that results from a second or multiple cuts by a blade in motion according to the invention, e.g., bits of grass, liquid products, such as juices, saps, glues, proteins, and other entrained biological masses. Secondary cutting products accumulated on blades tend to accumulate on stator elements as well. The effect is self-defining, so that a gentle C shape can also be defined for a particular general type of grass to be cut and a type of low energy sickle mower process as one in which reduced accumulation occurs. In the absence of such a definition, FIGS. 24–26, and 52–53 are illustrative, with the profiles of FIGS. 25 and 52 containing non-gentle C shapes. The straight profile of blade V in FIG. 24 constitutes a gentle C shape, except perhaps the small radius semi-circular indentation in the middle of the blade, which is not gentle and likely to accumulate secondary cutting products.

In order to achieve low energy operation, the sickle mower according to the invention uses low torque operation coupled with a torque management system, using an electronic control module. This torque management system achieves 4 objectives: [1] it regulates motor speed blade speed and allows low energy, low torque operation for lawn cutting; [2] it limits motor current draw or load on the prime mover during times of unduly heavy cutting blade loading or blade obstruction, thereby saving energy, protecting blades V, and possibly protecting the operator; [3] it acts to reverse blade motion to help clear blade obstructions and for blade cleaning; and [4] it can monitor needed motor torque and give appropriate visual, auditory, or other feedback for action by the user (e.g., vibrating the mower handle when the mower is pushed too fast). A preferred low energy sickle mower according to the invention would have mower blade V fed in forward motion at a constant speed using pulse width modulation on a DC motor, as known in the electrical arts; when grass on the cutting field gets heavy or thick, and/or the user walks forward at a fast rate, e.g., over 2.5 miles/hour (4 km/hr), the electronic control module will allow for more motor torque, such as by supplying more current to motor EM.

The electronic control module would monitor torque requirements of the cutting deck when in operation, by motor load monitoring, such as by monitoring motor current draw. If torque requirements increase rapidly and/or beyond a pre-set threshold, it can indicate that an obstruction has been encountered or that cleaning is required. In that case, a blade reversing or reverse motion can be undertaken, to perform a blade backout, kickout, or simple reverse motion for cleaning (see FIG. 51). At that time, the user can receive an audible feedback warning, for example, that the user is walking too fast into thick or hard-to-cut grass. Alternatively, a bank or set of light emitting diodes (LEDs) on the mower cover or handle can indicate load status, e.g., green LEDs illuminated when the walking speed of the mower is appropriate and torque values are normal; yellow LEDs illuminated to indicate that the user might wish to slow down for better cutting performance; and red LEDs to indicate blade reversing or actual blade reverse motion or obstruction clearing in progress.

The operator may attempt to start the mower after having pushed it into deep grass. This would ordinarily require a conventional mower to use extra starting torque to overcome the initial system inertia as well as cut all the grass in all flux traps between stator elements using a minimal or increasing blade speed. The torque management system of the low energy sickle mower of this invention would eliminate the need for a high starting torque, instead initiating a reverse motion of blades V to push much of the grass out of the flux traps in the cutting zone M. During an obstruction, a conventional mower might stall due to a sharp rise in needed motor torque to maintain blade speed. In that case, the torque management system of this system would identify an obstructed shear process by monitoring required torque, e.g., by monitoring motor current, since the motor current is nominally directly proportional to the applied torque. When the torque reaches a predetermined maximum, or rises too quickly, indicating an obstruction, the torque management system can initiate reversing or reverse motion of the motor to attempt to clear the path as discussed above. The electronic control module can visually and/or audibly warn the user of the obstruction.

Figure 38:
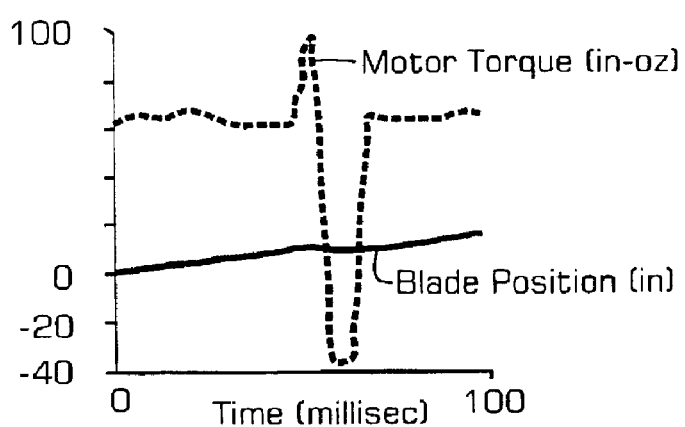
FIG. 38 shows a Cartesian plot of both motor torque and cutting blade position versus time.

Now referring to FIG. 38, a Cartesian plot of both motor torque and cutting blade position versus time is shown. Motor torque in inch-ounces is shown for an approximate 100 msec time period, with blade position also given in inches from an arbitrary reference. As can be seen from the plot, a motor torque of just over 60 in-oz is applied until about 50 msec has elapsed; at that time, a sudden increase in torque is needed to keep the motor speed constant to keep the mower blades at constant forward speed. As the motor torque approaches 100 in-oz, a reverse motion is applied to the motor, with the motor torque falling suddenly and briefly going negative to about −35 in-oz as shown at about 60 msec elapsed time. A slight blade reverse motion occurs, as evidenced by the decrease in absolute blade position shown. Thereafter, forward motion is re-initiated, and motor torque is ramped back up to about 60 in-oz. This process can be repeated if necessary.

Figure 39:
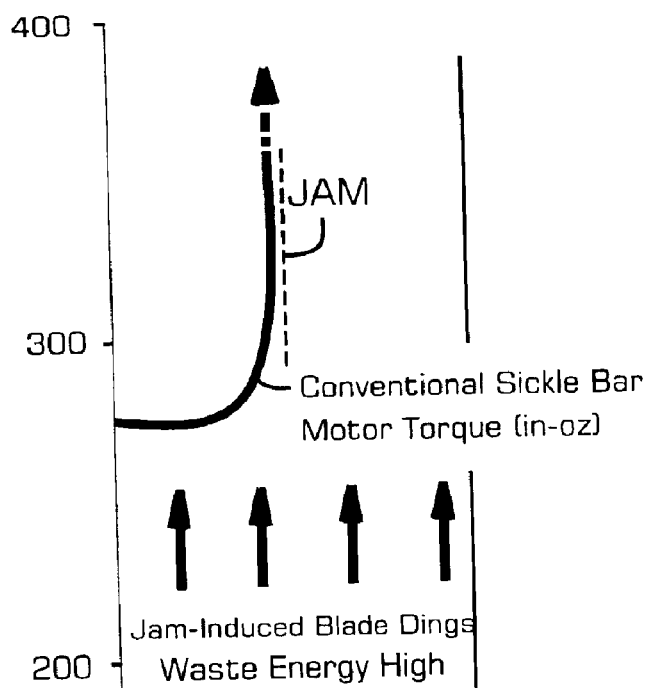
FIGS. 39 and 40 show Cartesian plots comparing conventional sickle bar motor torque versus motor torque of a low energy sickle mower according to the invention, as a function of time.
Figure 40:
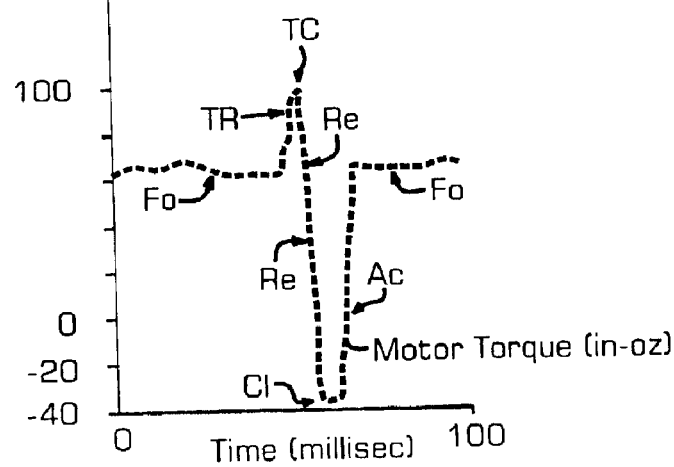

Now referring to FIGS. 39 and 40, Cartesian time plots comparing conventional sickle bar motor torque versus motor torque of a low energy sickle mower according to the invention are shown, and portraying the same sequence of events surrounding an obstruction encounter as shown in FIG. 38. FIGS. 39 and 40 share the cartesian axes and abscissa of 0–100 msec as before. A conservative estimate of torque requirements for a small conventional sickle mower is given in FIG. 39, showing how the conventional sickle bar mower required torque goes from 270 in-oz to well over 400 in-oz (off the plot scale) when encountering an obstruction. This can cause jamming of the sickle mower mechanism and jam-induced blade dings (see FIGS. 17 and 18 above). It also implies necessarily a high degree of waste energy that must be expended. At the lower end, FIG. 40 shows the motor torque plot of FIG. 38 repeated, but with event labels. A forward motor torque Fo is applied, just over 60 in-oz as before. A torque rise TR occurs as the torque management system tries to keep the blade forward motion constant in spite of increased operating resistance. The required torque then either rises sufficiently rapidly to signal the torque management system—or reaches a threshold TC as shown to signal the torque management system—to take a remedial action, in this case the application of a reversing torque Re as shown to bring the torque and blade position to a clear point Cl in an attempt to clear the obstruction or clean the blade. The position of the clear point Cl can be pre-set, recorded into a data table as known in the electronic arts, or it can be determined on the fly by the exact nature of the torque curves encountered. After the clear point Cl has been reached, an accelerating torque Ac is applied as shown, until a value is reached that is compatible with switching back to the forward motor torque Fo as shown, continuing until near the 100 msec time mark.

Figure 41:
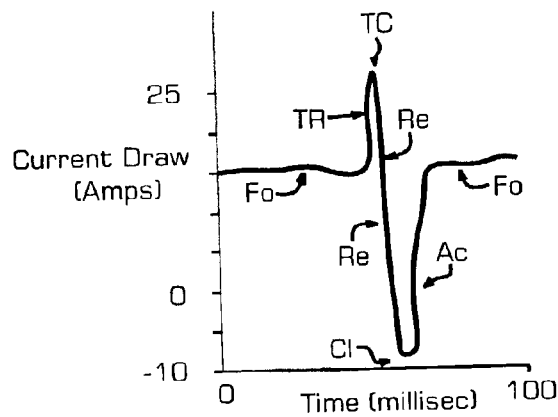
FIG. 41 shows a Cartesian plot of motor current draw versus time, for a low energy sickle mower according to the invention, and along the same time frame as depicted in the Cartesian plot of FIG. 40.

Now referring to FIG. 41 a similar Cartesian plot is shown for the same sequence of events, but showing the actual quantity monitored directly by the torque management system: motor current draw (amperes) versus time. The preferred embodiment is for a 12 volt system, using a 12 volt battery pack BAT. If necessary, any non-linear features of the motor torque curve that would be significant to any electronic control module can be recorded for use by the electronic control module in interpreting the motor current torque.

In this way, a human finger mistakenly put between stator elements can be protected from severing, as the torque management system will prevent unduly high maximum torques, and in any case, the low energy sickle mower according to the invention dispenses with the requirement for, and need to have a high torque capability. Thresholds established to initiate reversing or reverse motion can be sensitive, such as when such an action is started as soon as the motor current exceeds 110% of its steady state forward torque Fo; or can be less sensitive, such as a 150% threshold. In actual testing, a common #2 pencil was inserted into the stator elements, through the flux trap associated with a cutting zone, with the motor operating at maximum torque, and the mower was unable to break or sever the pencil.

A typical motor set up might include a commonly available ⅓HP, 0–4500 RPM (revolutions/min) rated DC motor, such as available from the Owosso Motor Group, Owosso, Ohio. The motor is then geared down using a final reduction gearbox known in the mechanical arts, so that a motor speed of 2500 RPM become a rotational speed of 500 RPM to be delivered at driveshaft DS and its associated driven sprocket (not shown) for imparting motion to the blade chain. This increases the running torque for driveshaft DS by almost a factor of five, accounting for friction. Using an appropriately sized drive sprocket, this allows for a blade lateral velocity of 7.5 MPH (12 km/hr) or 132 inches/second (335 cm/sec), while a typical walk speed for forward motion of the mower is about 2.5 mile/hour (4 km/hr) or 44 inches/sec (112 cm/sec).

In a preferred embodiment, the cutting deck D has about 20 blades V, arrayed about the bed B over 360 degrees, while there about 20 sets of upper and lower stator elements arrayed over about 180 degrees at the anterior portion of the mower, so the blade/stator population ratio is about ½ or 50%. This works out to about 3 blade swipes per forward inch of mower walk, or a 360 degree sweep frequency for the blades V of about 8.5 Hz. A bevel as discussed above is employed, with about ¼ inch (6 mm) initial taper at the anterior end of upper stator elements 6E, as shown qualitatively in FIG. 29. Using the above described actions taken by the torque management system, the pause taken for a reversing motion could take place over about a 0.8 inch (20 mm) mower forward motion; this can be tolerated since grass blades typically remain in their respective flux traps long enough for cutting to occur in spite of that interval.

Figure 42:
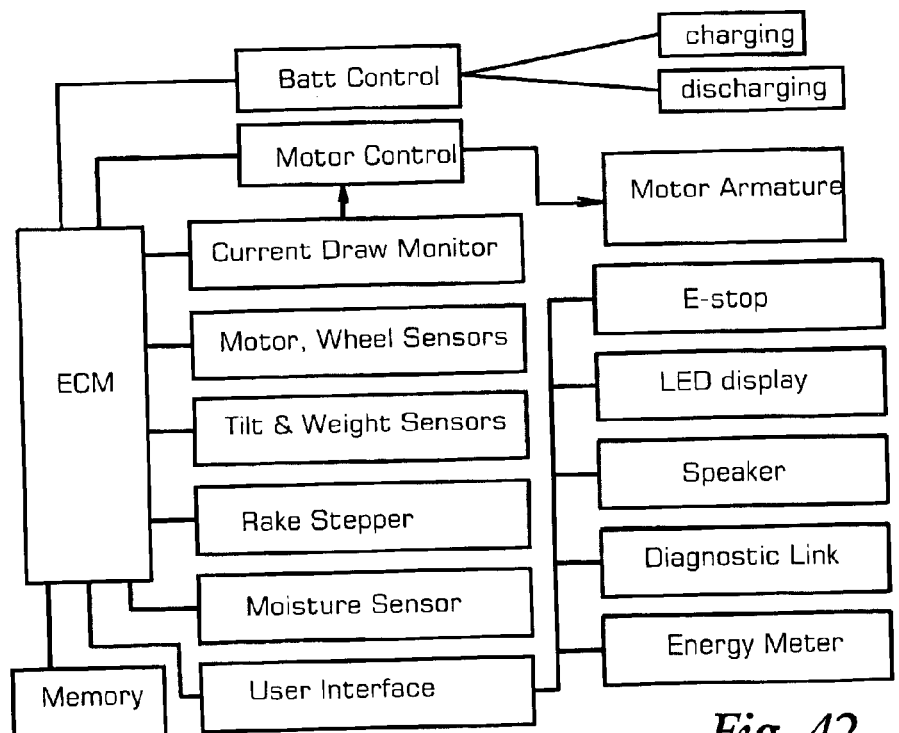
FIG. 42 shows an example of a functional schematic block diagram for possible controls and interfaces for a low energy sickle mower according to the invention.

Now referring to FIG. 42, an example of a functional schematic block diagram for possible controls and interfaces, including a torque management system, for a low energy sickle mower according to the invention is shown. The design, specification, construction, fabrication, and programming of such a control system is known in the electronic arts. As shown, a motor control unit (Motor Control) determines behavior of a motor armature (e.g., by varying motor currents, e.g., using well known pulse width modulation), and a battery control system (Batt Control) regulates charging and discharging activities. The motor control and battery control also interface with an electronic control module (ECM), which as shown has a number of possible functions shown illustratively and whose manufacture, selection, programming and use are well known. A Current Draw Monitor monitors average or effective motor current draw as a way of performing motor load monitoring and feeds this information to both the motor control and to the ECM. The ECM is an active device capable of following decision trees and controlling outputs with the help of input signals that encode the value of various parameters. Low cost microrocessors such as a Microchip Technology Part No. PIC16F870 chip can be used for the ECM (Microchip Technology, Chandler, Ariz.). The ECU communicates with a memory module (Memory) as shown, where a ROM BIOS, programs, and data tables can be stored for its use in executing program instructions that are encoded or recorded into ROM (read only memory), as is known.

As shown, the ECM can also communicate with various peripheral devices, such as motor and wheel sensors (Motor, Wheel Sensors) that give rotational speed and/or position information; tilt and weight sensors (Tilt & Weight Sensors) to sense if the mower is tilted or is not sitting on its wheels; a Rake Stepper to change the mower rake angle and to sense position and speed information from a rake stepper (see FIG. 50); a Moisture Sensor to sense the presence of excess moisture; and a User Interface as shown. The user interface can comprise a emergency stop switch set (shown, E-stop); an LED Display, Speaker, Diagnostic Link, and an Energy Meter. The techniques used for programming such an ECM are well known in the electronic arts. Ref: (microcontroller design) PIC16F870/871 Data Sheet, published by Microchip Technology Inc., ©1999; also PICmicro MidRange MCU Family Reference Guide, published by Microchip Technology Inc., ©1997; also Analog I/O Design, published by Reston Publishing Company, Inc., Reston, Va., ©1981.

The motor and wheel sensors are useful for the ECM to regulate motor speed in response to varying load and field use conditions, such as differing operator forward walking speeds; or in the case of a self-propelled mower, the ECM can set the forward motion speed of the mower for optimum cutting results and operating efficiency. The required motor torque can be modulated by the ECM and/or motor control to maintain a desired blade speed or motor speed, e.g., 2500 RPM as suggested above. During the course of a reversing or reverse motion, the ECM can gain valuable input information as to the location of the blade at all times, and the torque profile leading up to an obstruction, as well as a torque profile during attempted clearing of an obstruction. The ECM can also take energy saving steps, such as a "sleep" mode that it would commence if no mower forward motion occurs for a time, whereby it would slow down or stop blade forward motion to save energy. The ECM can also signal the user interface to alert the operator about the need to slow down, e.g., with the use of yellow LEDs, or the need to stop, using red LEDs, by the interface. The information gained through the tilt and weight sensors can be used by the ECM to stop mower operation if [1] the mower is tilted excessively or too quickly; [2] not operated on the ground, i.e., with no curb weight sensed on its wheels; [3] the mower is jarred, dropped, allowed to fall, or crashed into an obstruction or wall. Similarly, the moisture sensor can tell the ECM about local field conditions, allowing customization of the torque curves used for operation; it can also stop the mower if immersed in water or mud.

The speaker can be used to provide sounds that: [1] emulate a rotary mower in some respect that might enhance safety or operational ease, and might warn the user about discouraged behaviors, such as tapping on or tampering with the blades V, which could be detected perhaps by the motor sensor; [2] provide confirmation of various functions, such as a completed obstruction backout or kickout; and [3] provide messages concerning battery status, blade status, ideal walking speed, or a reason why the mower was shut down. And LED display, or an LCD display if desired (not shown) can perform some of these functions in a similar way, including those of the energy meter, which can give mower operating power and/or useful battery life left before a recharging is necessary. The memory accessed by the ECM can contain historical information and can provide modification of mower behaviors, e.g., a very slow blade forward motion startup after the E-stop switch has been actuated, or application of jitter to a blade V for problematic obstructions that have not been resolved in previous reversing attempts. The diagnostic link can be used to attach to a servicing/ analysis system which can read the ECM for recorded operation faults or conditions recorded during prior operation of the mower, in analogy to what is done for modern passenger vehicles in the automotive industry. It can also diagnose or even run the mower, as during testing, to check for specific operating irregularities. Finally, the diagnostic link can be used as a conduit by which the ECM can be reprogrammed, updated, or shut down.

As mentioned earlier, a proper Total Controlled Gap Z of the controlled gap thin blade shear process is important and will give an unexpectedly high overall mower efficiency relative to prior art or conventional sickle mowers.

Figure 43:
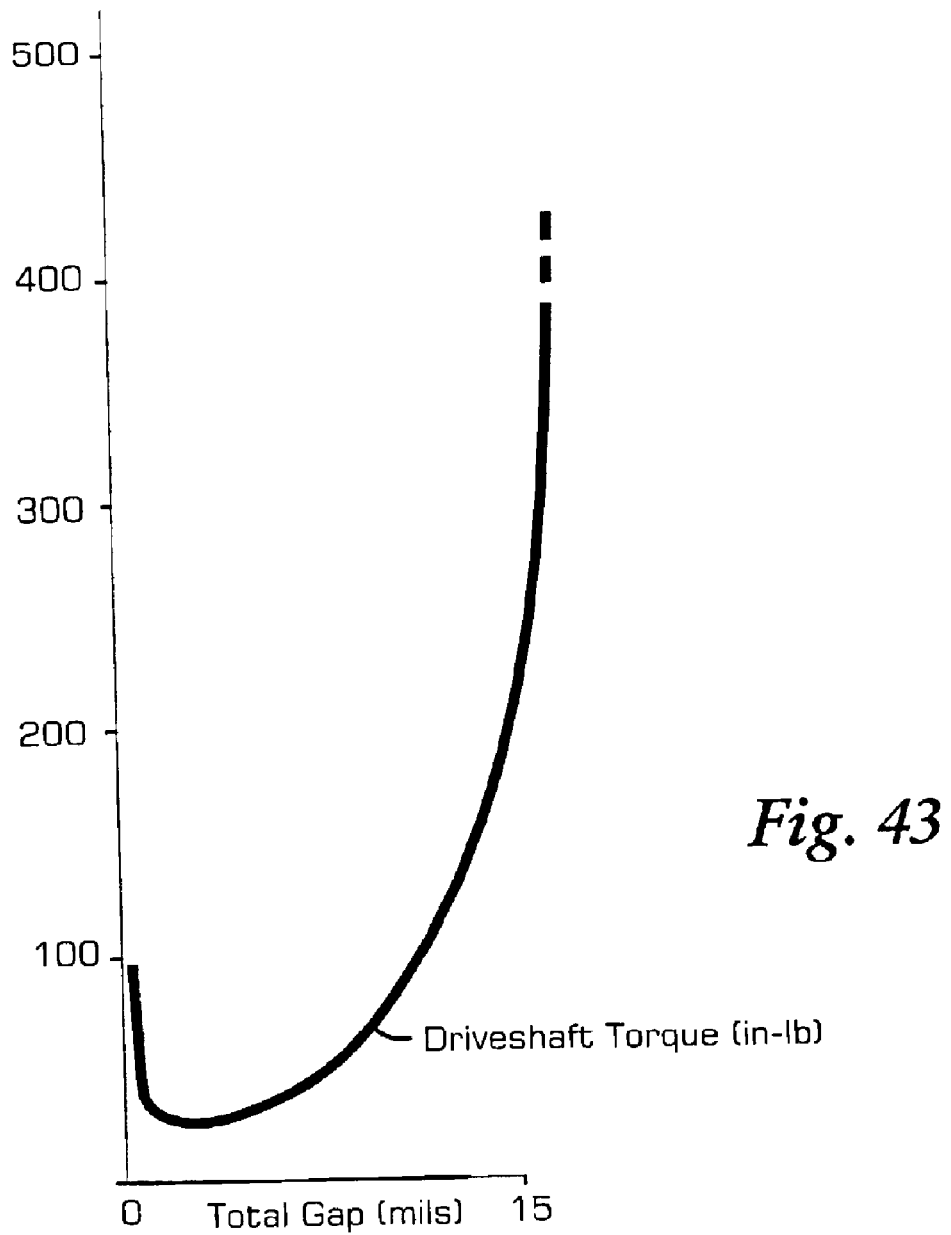
FIG. 43 shows a Cartesian plot of typical driveshaft torque needed versus total gap between stators and blades for a low energy sickle mower according to the invention operating on a cutting field.

Now referring to FIG. 43, a Cartesian plot of typical driveshaft torque needed for driveshaft DS versus total gap between stators and blades is shown for a low energy sickle mower according to the invention operating on a cutting field comprised mainly of Kentucky Bluegrass. The Total Controlled Gap Z is shown on the abscissa, and Driveshaft Torque in in-lbs (after gearing reduction) is given as a function of the Total Controlled Gap Z for a twin shear site mower as described above. Single shear site mower results are similar, except the Total Controlled Gap Z must be divided by two. The operating torque as shown is relatively high (nearly 100 in-lbs) for a minimal (e.g., approximately zero) total gap because of blade-stator frictional effects— there is much dry rubbing between blades and stators. Then as the Total Controlled Gap Z goes up, the required driveshaft torque goes down; it reaches a minimum for the preferred embodiment disclosed here of about 30 in-lbs at a total gap of 2 to 5 mils; then it goes up slowly as Total Controlled Gap Z increases further, and increases sharply for Z greater than 10 mils. This is due to a gradual change in the overall cutting regime from a shear cut as illustrated in FIG. 34 more toward the tensile cut as illustrated in FIG. 35, which for large total gaps can result in entrainment of the grass blades in the cutting zone itself—a sort of entanglement of grass that gets drawn into the cutting zone. The extra energy needed for this cut, along with much higher viscodynamic drag effects from the additional secondary cutting products that accumulate, causes this increase in required driveshaft torque. Basically, the cutting zone M becomes a mess for large gaps, and the accumulated material becomes a bona fide viscodynamic brake. This illustrates perhaps another reason why conventional prior art sickle mowers have traditionally needed a high torque prime mover for successful operation, because they often operate in this regime.

Figure 44:
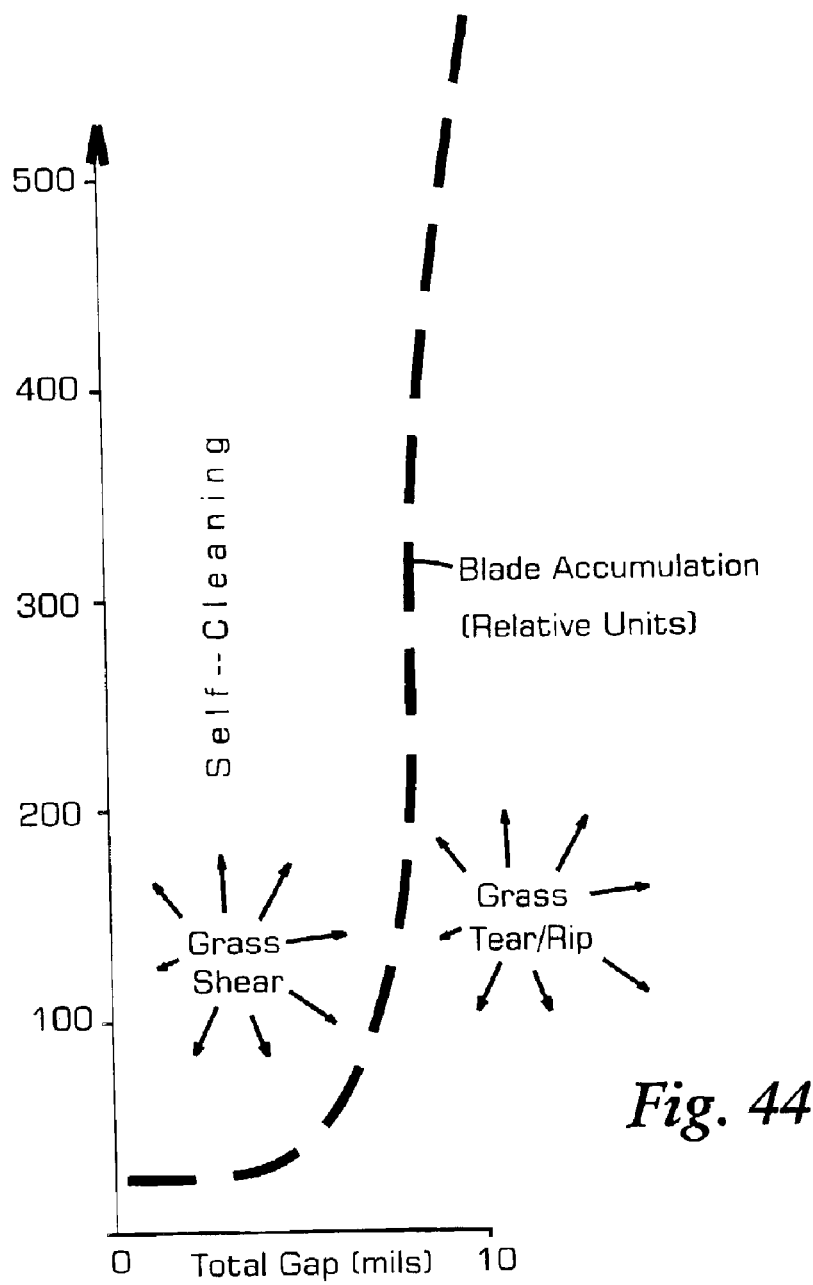
FIG. 44 shows a Cartesian plot of blade accumulation versus total gap between stators and blades for a low energy sickle mower according to the invention.

Now referring to FIG. 44, a Cartesian plot is given of cutting blade accumulation versus the Total Controlled Gap Z (shown, Total Gap) between stators and blades for a twin shear site low energy sickle mower used according to the invention. In this qualitative plot, blade accumulation, shown in relative units, goes up sharply for Total Controlled Gap Z greater than about 8 mils, as shown. This divergence creates two cutting regimes, as illustrated: a grass shear regime (shown, Grass Shear) for low Total Controlled Gap Z where the cutting blades are more or less self-cleaning; and a tensile or rip cut regime (shown, Grass Tear/Rip) for Total Controlled Gap Z higher than about 8 mils, where the blade accumulates secondary cutting products to a high degree. By operating a mower in the self cleaning shear regime using a low Total Controlled Gap Z (but not too low, e.g., not zero mils, or preferably, greater than 1 mil), the objectives of this invention can be met, when the mower is designed and operated as taught here.

Figure 45:
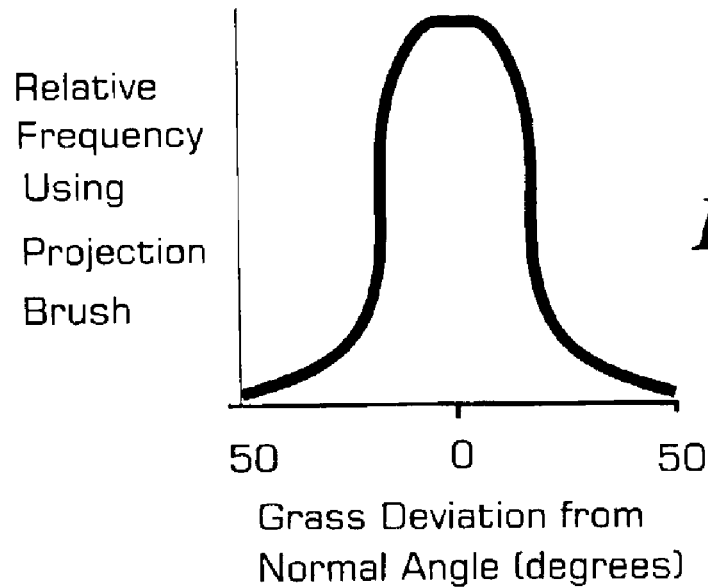
FIG. 45 shows a normal distribution of grass orientations that qualitatively shows deviation from a vertical angle for grass after having been conditioned by a projection brush earlier described.
Figure 46:
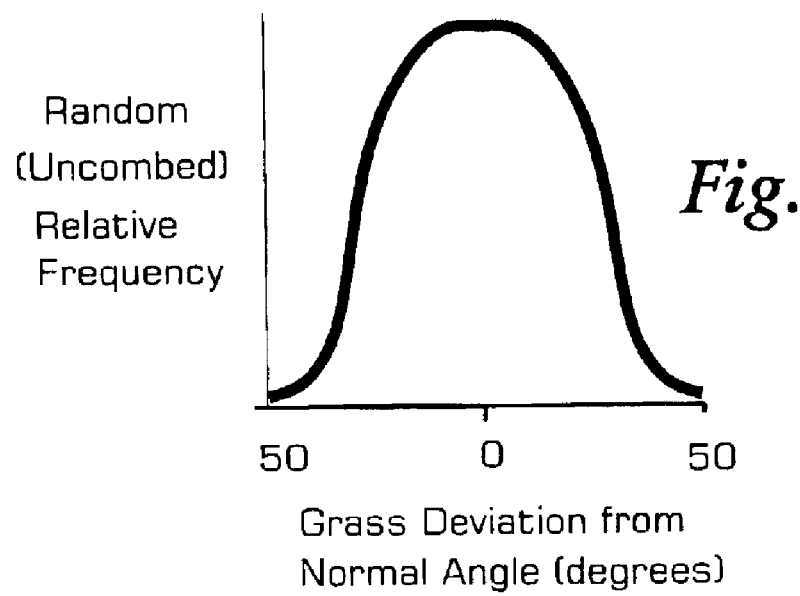
FIG. 46 shows a normal distribution similar to that of FIG. 45, but for grass not conditioned by a projection brush.

Now referring to FIG. 45, the effects of using a projection brush X can be shown using a plot of a normal distribution that qualitatively shows a distribution of orientations for grass after having been conditioned by the projection brush. Many grasses, such as grasses with open growth habits, propagate and flourish in a multitude of directions, and there is a degree of randomness normally associated with the angles that blade of grass make with the local normal vector or gravitational vector. So, the actual direction of grass blades on a cutting field is complex, and for good reason, as grasses are often structurally complex systems often comprising stolons, runners, rhizomes, growing or existing in many unpredictable directions. Using the projection brush X earlier described, a narrow distribution of the frequency of deviation of grass blades from a normal angle (perpendicular to the ground) is achieved, as shown in the normal distribution given in the figure. By contrast, FIG. 46 shows a similar normal distribution, but for grass not conditioned by a projection brush, and it can be seen that the normal distribution is not as narrow, with many more grass blades bent to a large extent away from the perpendicular, and therefore likely to avoid being cut as discussed earlier.

Each of the elements of the invention already described work together, and only in light of that, can a control system, including a torque management system, be designed. The examples given here are illustrative only, and those with ordinary skill in the programming and control arts can no doubt produces many variants based on the instant teachings.

Figure 47:
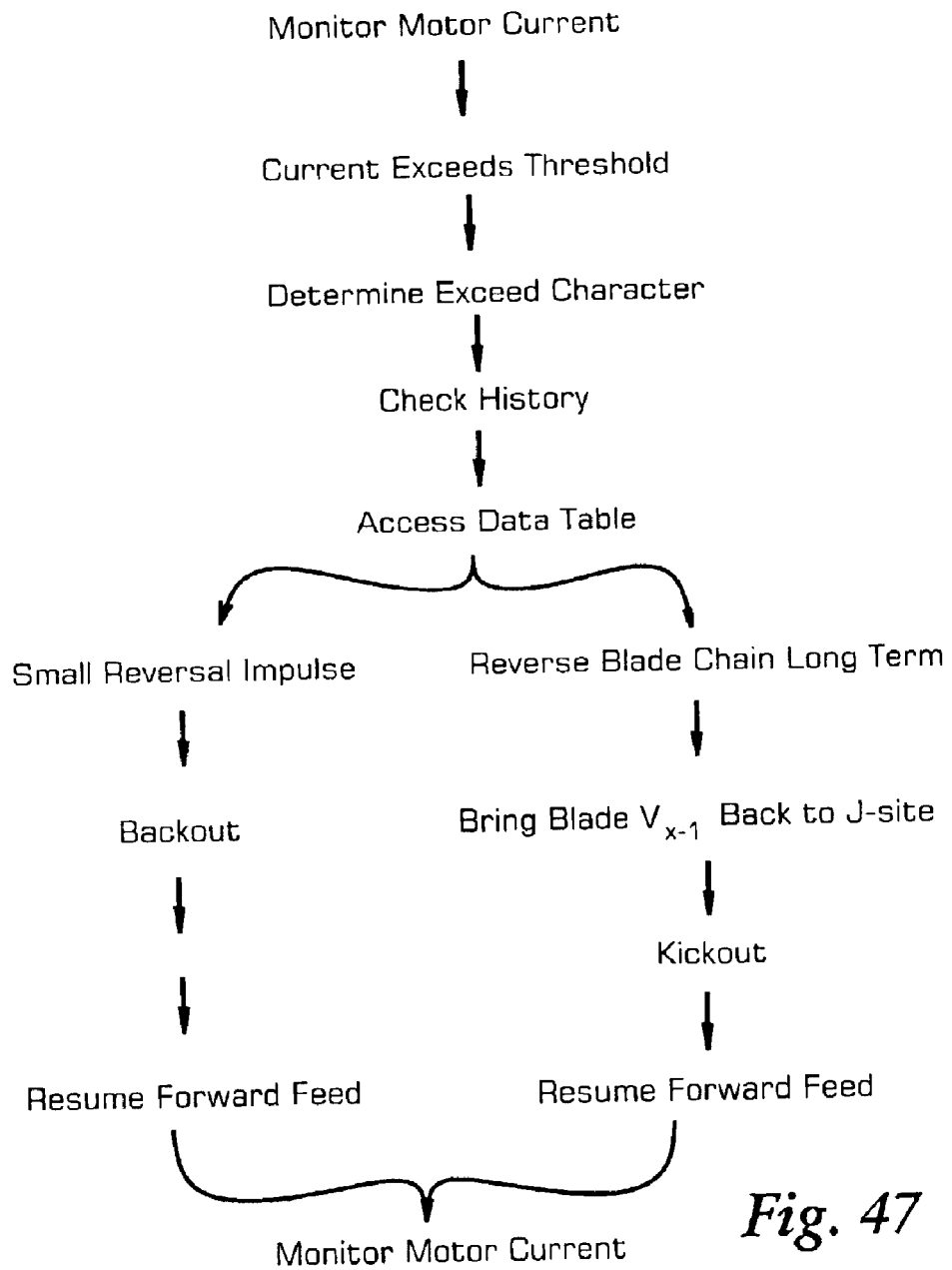
FIG. 47 shows a possible flow chart for an electronic control module in executing torque management for a low energy sickle mower according to the invention.

Now referring to FIG. 47, a possible flow chart is shown for an electronic control module in executing torque management for a low energy sickle mower according to the invention. An electronic control module (ECM) as discussed above can be programmed to execute this or other protocols. As an example, as given in the figure, the ECU, with assistance from the current draw monitor, performs motor load monitoring by measuring or monitoring motor current. During an obstruction event, or from excessive accumulation of secondary cutting products on the blades and/or stators, the motor current exceeds a threshold as given. The threshold can be fixed, and looked up and compared that given in a data table; or it can be determined from data recorded from recent mowing history, e.g., the last 50 seconds of mowing.

Upon exceeding such a threshold, the ECM can determine the exceed character, such as whether it results from a simple spike that occurs in a periodic manner (which might indicate a piece of debris traveling with the blade and getting caught on most stator elements, or once per revolution around the cutting deck); or whether it is a simple rise over several minutes' duration (possibly indicating blade accumulation of debris); or whether it has arisen suddenly and has not abated (possibly an obstruction that has stopped the cutting blade motion entirely). Once the ECM has determined the likely exceed character, it then can look up any relevant history of previous exceeds that have occurred, and make a decision or a choice that reflects the likely source of the problem and the best course of action, given the recent blade movement history. Once this is done, a recipe of sorts for remedying the problem can be accessed by looking up the prescription for that type of event in a data table contained in the memory of the ECM.

Two such prescriptions are given here, merely for illustrative purposes. In one, a backout is performed in which a small reversal impulse is imparted to the blade chain by the motor control, which receives signals from the ECM and feeds the desired motor drive currents. In another, a kickout is performed in which the blade chain is set into reverse motion for the long term, e.g., more than 10 milliseconds, and possibly to insure that a blade already having passed the obstruction site is set into reverse motion to kickout the obstruction using its reverse face. After either of these two prescriptions, the ECM can resume a normal forward feed protocol for the blade chain, and re-monitor anew the motor current draw, looking for new irregularities.

Figure 48:
FIG. 48 shows a gray-tone photograph of a top-down view of the surface of a cutting blade and stator during impingement upon a grass blade.

Now referring to FIG. 48 a gray-tone photograph is given of a top-down view of the surface of a cutting blade and stator during impingement upon a grass blade. The anterior portion of the mower is to the right on the figure. Three full stator elements are visible, with the third stator element somewhat obscured by a round profile leaf. Between the first and second stator elements a blade of grass is undergoing imminent shear failure by action of a moving blade, moving downward in the figure toward the second stator element, having already moved perhaps ⅔ of the way across the flux trap located there. The curvature or blade profile of the blade is visible and it is a gentle C shape. Between the first full stator element shown and the next, which is only partially visible at the top of the figure, some grass blades are crossing the flux trap there. Notice the multi-directional nature of the grass blades in the area in front of (to the right of, in the figure) the stator elements. These grass blades are not benefitting from use of a projection brush.

Figure 49:
FIG. 49 shows a gray-tone photograph of a top-down view of the surface of a cutting blade and stator during reverse motion and elimination of a vertically oriented obstruction as shown.

Now referring to FIG. 49, there is shown a gray-tone photograph of a top-down view of the surface of a cutting blade and stator during reverse motion and elimination of a vertically oriented obstruction as shown. The anterior portion of the mower is on the bottom on the figure; between two stator elements at the center of the figure is a blade, shown moving to the right in reverse motion to expel an obstruction (a stick) resembling that shown in FIG. 19.

Figure 8:
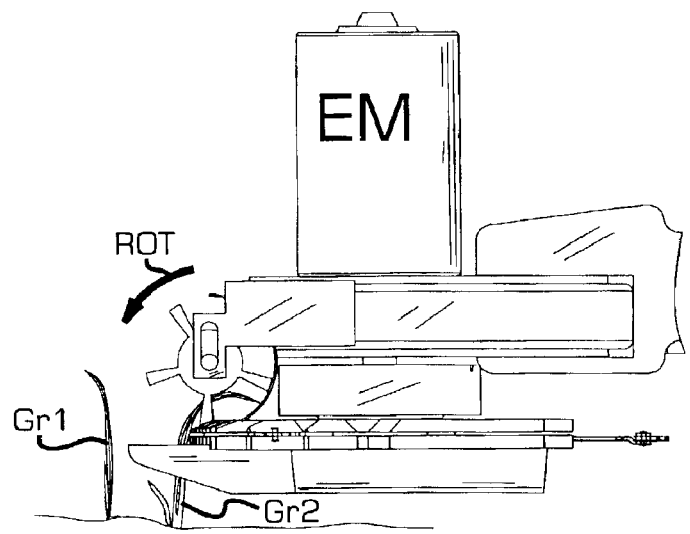
FIG. 8 shows the close-up side surface view of FIG. 7, but at a later time and displaced forwardly upon the grass shown.
Figure 50:
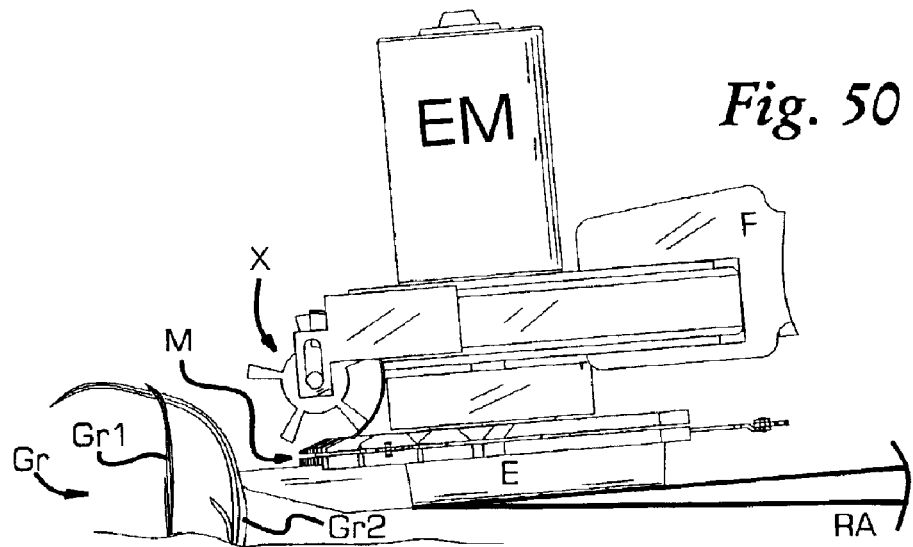
FIG. 50 shows a view similar to that of FIG. 8, demonstrating a rake angle of the deck with respect to a horizontal cutting field.

Now referring to FIG. 50 a view similar to that of FIG. 8, is given, demonstrating a Rake angle ($\alpha$) as shown, of the deck with respect to a horizontal cutting field. Early on in prototyping a discovery was made which revealed the nature of grass itself. Most lawns and turf grasses are multi-directional in their growth habits, as mentioned. With grass being a complex system with runners and with intertwined, interdependent or linked blades, there is a great deal of mechanical coupling between grass blades, and between the grass and any other plants such as weeds growing it its midst. For a simple empirical example, pushing grass down with one's finger reveals this mechanical coupling, as it is likely that other blades of grass not touched will also move downward as well. In sense, a lawn is a net which responds to a contact, with coupling effects beyond the radius of that contact.

In moving a mower of this invention across a cutting field, it was discovered that a ¼ inch thick plate used as the lower stator 9 at the bottom of the cutting deck D acted in Kentucky bluegrass to move the grass ahead of it downward, preventing some grass from entering the cutting zone M. Others have tried to solve this problem by combing the grass with a comb prior to it entry into the cutting deck, but this does not work very well. What we have found is that when the cutting deck is tilted a few degrees downward then the deck does not bend disadvantageously the grass downward in front of the deck. If this were a machine tool or machine with a carbide insert, this would be referred to in the art as the "rake angle," and we adopt that nomenclature here. In the metal cutting industry, a rake angle is used to help break material being removed into chips and improve the surface finish of the work piece. Here, the rake angle is used to reduce the interdependent effect of the grass being cut, and maximize grass input into the cutting zones. As can be seen, the deck is tilted with a rake angle RA (see Definition) so that the anterior portion of the cutting deck D is brought closer to the ground than posterior portions of the mower. The rake angle can be changed in a number of ways, independently, or together, using methods well known in the mechanical arts: one can change the angle that the deck D makes with the frame F; or alternatively, the roller height of rollers O can be adjusted to tilt the frame overall; or a similar change or tilt can be effected by modulating the axle height of wheels W.

Figure 51:
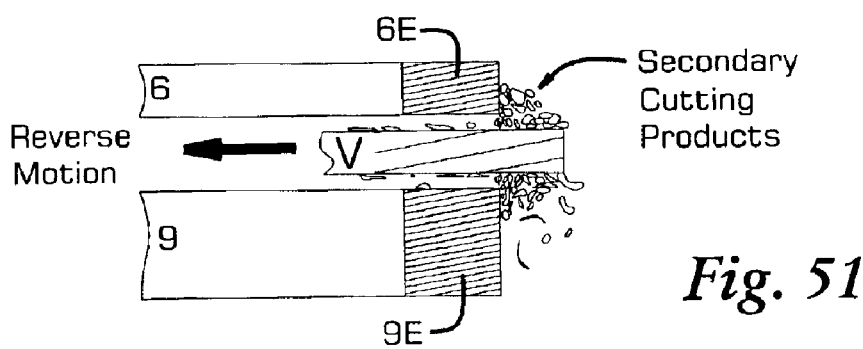
FIG. 51 shows a view similar to that of FIG. 34, demonstrating blade cleaning during blade reverse motion.

Now referring to FIG. 51, a view similar to that of FIG. 34 is given, demonstrating blade cleaning during blade reverse motion. In the figure, a blade V moves in reverse motion to the left on the figure, between upper stator 6 and lower stator 9; the large gap shown is for illustrative purposes, to show more clearly blade accumulation of secondary cutting products. As can be seen reverse motion of the blade V can allow expelling of debris and secondary cutting products as depicted, as the stacking structure or other structural evolution of the debris is disrupted by the sudden reverse "combing" afforded by the upper stator element 6E and lower stator element 9E. The secondary cutting products shown, once so disrupted, lack structural unity and tend to fall to the ground, especially after the blade passes through. This is an important technique discovered for maintaining blade cleanliness, and lowering blade drag and energy consumption.

Another effect discovered, as mentioned, is the dependence of the accumulation of secondary cutting products on the blade profile radius, as discussed above. Now referring to FIGS. 52 and 53, views similar to those of FIGS. 24–26 are given, portraying qualitatively blade cleanliness for smaller and larger blade profile radii, respectively. As can be seen, blade V in FIG. 52 comprises a profile having a sharp radius or small radius profile, with a characteristic local average radius r as shown. Such a blade tends to accumulate more secondary cutting products than the blade V shown in FIG. 53 which comprises a gentle C shape, and comprising a characteristic local average radius R as shown, where R>r. The design of blade profiles can thus take this into account for increased blade effectiveness, decreased viscodynamic blade-stator drag, and decreased mower energy consumption.

The Total Controlled Gap Z or a single gap, in the case of a single set of stator elements as shown in FIG. 36 as taught is achieved by close attention to many considerations, including blade and stator fabrication, and precise mechanical support of blade V. Having the blade V guidingly supported by a stator, and specifically upper stator 6 and lower stator 9, is no accident—it takes precise mechanical support in the immediate vicinity of the blade V, and with blade chains and the like, it cannot be expected that controlled gap thin blade shear process taught will be achieved or served by guiding of the blade chain, which has too much mechanical play and degrees of freedom associated with it. Values for Total Controlled Gap Z can vary as mentioned earlier, and can be under 2 mils, if achievable. A good compromise between having a small Z and mechanical considerations that make a small gap difficult to maintain, such as component shifting, component non-smoothness, and component wear, is to have a preferred Total Controlled Gap Z between 2 and 5 mils. Even starting at 4 mils, however, the grass starts to tear sometimes for some individual grass cuts using the controlled gap thin blade shear process.

To achieve a controlled gap thin blade shear process, one needs to have appropriate manufacturing processes to achieve dimensional precision and consistency from blade to blade. Since the blade thickness is so critical here, the blades V can be fabricated in sets from a common piece of raw materia. Generally, a single piece of metal sheet varies in thickness slowly, so that if blades for a given mower are produced together in matched sets from a single original raw sheet, the thickness is inherently controlled with out adding the expense associated with precision stock material.

Blades V can be fabricated from any number of known materials, using techniques known in the mechanical arts. Blades V must be designed to operate in a field environment, and are subject to mechanical wear and shock. In addition to the demands posed by cutting grass and small brush, there is the possibility of encountering entrained materials like pebbles and sand, and allowance must also be made for small malfunctions or upsets, such as having the mower collide with tree stumps while cutting blades V are in motion, etc. Blades V therefore have to meet two design objectives: [1] high hardness, to resist wear and deformation, especially at front face FF; and [2] toughness/elasticity so as to not be excessively brittle and subject to shattering or other catastrophic failures during cutting operations. Heat treatments and hard facing of steels is well known (Ref: Machinery's Handbook, 25$^{th}$ Ed., Industrial Press, Inc., New York © 1996, hereby incorporated herein in its entirety). One possible approach is to use Teflon®-containing electroless nickel plated over a variety of heat treated steels, so as to allow a Rockwell C40 or greater hardness on the outside, and the high tensile, compressive and shear strength on the inside. Another approach is to start with a Nickel-Chromium-Molybdenum steel, such as SAE 4140, and heat treat the cutting edge, such as front face FF, using a flame or laser; heat treating to a depth of 0.06 inches (1.5 mm) will allow a Rockwell hardness of 50C, while the remainder of the blade V will be a relatively strong and soft Rockwell 30C hardness. Alternatively, cold roll steel plates can be carburized where hardness is desired. Other heat treatments and hard facing treatments available include annealing, such as any combination of black, box, cycle, flame, full, or quench annealing; quench hardening; spheroidizing; steel normalizing to enhance further treatments; and various case hardening processes like cyanide hardening; nitriding, including ion nitriding; liquid, gas and vacuum carburizing; flame hardening and induction hardening; and laser and electron beam surface hardening. Plating processes can also be used to enhance surface hardness and reduce wear, while allowing for better dimensional consistency and for friction reduction in the cutting deck, e.g., electroless nickel, with or without added Teflon® (PTFE).

The same considerations apply here to the upper and lower stators, but if they are stationary, there is less of a need to make them shatter-proof. Self-lubricating plastic or high molecular weight liners can be used for friction reduction and maintenance reduction in and around the bed B, guide groove GG, etc. Teflon coatings, and high molecular weight polymers can be used to plate or line stator surfaces. Portions of the cutting deck, such as upper stator 6, can be fabricated from plastic, the specification, selection, and fabrication of which is known. With friction reduction comes the possibility of further reductions in Total Controlled Gap Z without undue running friction and increased energy consumption.

A mower according to the invention can be used to cut an artificial grass product, such as known by the trade name Astroturf®, or any other artificial fiber, during manufacturing of the artificial grass or on an installation site so as to provide a level fiber or yarn height level in spite of slightly non-level ground conditions at the site. The artificial grass can comprise any number of structures and materials; for example, it can, as disclosed in U.S. Pat. Nos. 4,356,220 and 4,230,752 to Benedyk, comprise a pile fabric with yarn comprised of a plurality of fibers made of a polymeric material selected from the group consisting of copolymers of ethylene-vinyl acetate, ethylene-ethyl acrylate, ethylene-butylene, ethylene-propylene; polyvinyl chloride; chlorinated polyolefins; low density polyethylene; and mixtures thereof. Such an artificial grass can have fibers extending from and substantially perpendicular to a backing to which the fibers are secured, and the yarn can be twisted at the point of emergence from the backing. Such a yarn to be cut can also have various rectangular cross-sections, such as, for example, from 0.002 in. to 0.020 in. in thickness and from 0.010 in. to 0.200 in. in width; alternatively, such a yarn can have a generally circular cross-section, for example, 0.001 to 0.01 inches diameter; parameters for turfgrass cutting serve well here. Along with optional additives such as colorants, fillers, flame retardants, ultraviolet stabilizers, antioxidants, antistatic agents and antisoiling agents, this artificial grass or turf can be manufactured to open tolerances with respect to overall height above the backing, and mowed by a mower according to the invention, without tear or tensile damage normally associated with moving blades, and without problematic high required operating torques needed when using a heavy shear process such as that used in the reel mower or similar mechanisms. The fibers or yard thus envisioned can be tufted into the backing; woven into a warp and fill backing; knitted with the fibers of the backing itself; or the yarn can be tufted into a backing to form successive rows of loops of fibers that are cut to provide a cut-pile face. The fibers can then be shear cut using the controlled gap thin blade shear process given here. And generally speaking, the artificial material need not be a grass-like product, but may instead be intended for other uses, e.g., fiberglass insulation, composite materials, coverings, backings, or shields. A mower according to the invention can be used to trim, finish, or customize any such artificial products using the precise shear process taught herein.

A low energy sickle mower according to the invention can also comprise a multiple blade set deck, e.g., having multiple vertically stacked blade sets, and or more stators, as can be contemplated by anyone with ordinary skill in the mechanical arts upon reading this specification.

Most importantly, the endless cutter arrangement whereby the cutting blade moves in a somewhat circular way on a bed inside two stators does not have to be used. A reciprocating arrangement using a reciprocating lower stator that still emulates the controlled gap and other teachings here can be used instead and alternately as well, a single stator, for example a lower stator, can be used so long as the cutting blades are supported structurally to prevent undesirable deviations from proper orientation when under a cutting load; this might include springs or other mechanical devices to insure that the Total Controlled Gap Z or single controlled gap is controlled.

Also, those with ordinary skill in the mechanical arts can alter the cutting deck configuration to allow side cutting and edging. It is also possible to use the posterior portion of the cutting deck to do cutting, such as an option to feed grass clippings through the back side of the cutting deck to re-cut the grass them for mulching or clipping management.

Additional features can be added without departing from the scope of the invention.

The methods here have been shown to be effective in lowering energy consumption in a lawn mower, providing a controlled gap thin blade shear process that emits little noise, expends little energy, provides for a high degree of relative safety, and intelligent operation that handles obstructions and clears the blade. It also provides for blade geometries that accumulate less debris and lower running frictional losses. Such a mower is a lightweight, low exhaust emissions alternative to conventional rotary, reel, and sickle mowers.

The invention as disclosed using the above examples may be practiced using only some of the features mentioned above.

Obviously, many modifications and variations of the present invention is are possible in light of the above teaching. It is therefore to be understood that, within the scope of the appended claims, the invention may be practiced otherwise than as specifically described or suggested here.

We claim:

1. A low energy sickle mower using a controlled gap thin blade shear process to cut grass, said low energy sickle mower comprising:

A cutting deck (D) comprising a cutting blade (V) and a stator (S);

said cutting blade and said stator each so sized, shaped, formed and finished, and said cutting blade so drivingly positioned, such that said cutting blade is guidingly supported by said stator and shearingly passes by said stator with a total controlled gap (Z) between said cutting blade and said stator;

said stator comprising at least one stator element (SE) so formed and sized as to provide a shear failure site for said grass;

said stator comprising an upper stator (6) and a lower stator (9);

wherein said blade (V) is guidingly supported by means of sliding contact of said cutting blade with said upper stator such that said a controlled gap of between 1 and 10 mils (0.0254–0.254 mm) is forceably maintained between said cutting blade and said lower stator; said lower stator comprising said stator element and whereby grass is cut via a shear process as said cutting blade passes by said stator element of said lower stator.

2. The low energy sickle mower of claim 1, wherein said cutting blade additionally so shaped and formed so as to further comprise an upper leading edge (K1) and lower leading edge (K9), wherein said cutting blade is guidingly supported by said upper and lower stators, said upper and lower stators so sized, shaped, formed, finished and positioned such that a thickness of a cutting zone (M) formed therebetween exceeds the thickness of a blade zone (VZ) formed by said cutting blade upon a forward motion thereof by a total controlled gap (ZA);

said upper stator comprising at least one upper stator element (6E) and said lower stator comprising at least one lower stator element (9E), said upper stator element and said lower stator element each so formed and sized so as to provide an upper shear failure site and a lower shear failure site, respectively, for said grass upon passing of said upper leading edge and said lower leading edge of said cutting blade by said upper stator and said lower stator, respectively.

3. The low energy sickle mower of claim 1, wherein said cutting blade is dull starting from first use.

4. The low energy sickle mower of claim 2, wherein said cutting blade has a thickness between 10 and 50 mils (0.254 mm–1.27 mm).

5. The low energy sickle mower of claim 1, wherein said total controlled gap is between 1 and 5 mils (0.0254–0.127 mm).

6. The low energy sickle mower of claim 1, wherein said cutting blade has a thickness of less than 100 mils (2.54 mm).

7. The low energy sickle mower of claim 1, wherein said cutting blade has a thickness between 10 and 50 mils (0.254 mm–1.27 mm).

8. The low energy sickle mower of claim 1, wherein said cutting blade has a self-cleaning geometry comprising a gentle C shape profile, whereby accumulation of debris is reduced on said cutting blade.

9. The low energy sickle mower of claim 1, wherein said stator is beveled.

10. The low energy sickle mower of claim 1, wherein said low energy sickle mower additionally comprises an electronic control module and a torque management system for drivingly positioning said cutting blade, whereby a magnitude and direction of movement of said cutting blade is intelligently controlled by said electronic control module; said cutting blade driven by a motor (EM) to produce either forward blade motion or reverse blade motion using a motor torque generated by a forward or reverse motor current, respectively, wherein said electronic control module is so designed and programmed to perform;

[a] Motor load monitoring to detect and recognize a forward torque threshold for said motor torque for a forward motion of said blade in said cutting deck;

[b] Reversing blade forward motion upon exceeding said forward torque threshold by reversing said motor current;

[c] Resuming said blade forward motion by applying said forward motor current.

11. The low energy sickle mower of claim 1, wherein said cutting blade is dull.

12. The low energy sickle mower of claim 1, wherein said low energy sickle mower additionally comprises a projection brush (X) acting upon said grass.

13. The low energy sickle mower of claim 1, wherein said cutting blade is dull but additionally comprises a knife edge situated between said upper leading edge and said lower leading edge, said knife edge so sized and formed to cut grass upon forceable contact thereto.

* * * * *